United States Patent
Malhotra et al.

(10) Patent No.: US 10,831,526 B2
(45) Date of Patent: Nov. 10, 2020

(54) SYSTEM AND METHOD OF APPLICATION DISCOVERY

(71) Applicant: Virtual Instruments Corporation, San Jose, CA (US)

(72) Inventors: Arpit Malhotra, San Jose, CA (US); Nicholas York, San Ramon, CA (US); Susanta Pattanayak, San Jose, CA (US)

(73) Assignee: Virtual Instruments Corporation, San Jose, CA (US)

( * ) Notice: Subject to any disclaimer, the term of this patent is extended or adjusted under 35 U.S.C. 154(b) by 85 days.

(21) Appl. No.: 16/234,353

(22) Filed: Dec. 27, 2018

(65) Prior Publication Data
US 2019/0207837 A1    Jul. 4, 2019

Related U.S. Application Data

(60) Provisional application No. 62/611,892, filed on Dec. 29, 2017.

(51) Int. Cl.
*H04L 12/24* (2006.01)
*H04L 12/851* (2013.01)
(Continued)

(52) U.S. Cl.
CPC ........ *G06F 9/45558* (2013.01); *G06F 9/5077* (2013.01); *H04L 41/0233* (2013.01);
(Continued)

(58) Field of Classification Search
CPC .............. G06F 9/45558; G06F 9/5077; G06F 2009/4557; G06F 2009/45591;
(Continued)

(56) References Cited

U.S. PATENT DOCUMENTS 7,185,192 B1   2/2007  Kahn
7,634,595 B1  12/2009  Brown
(Continued)

FOREIGN PATENT DOCUMENTS

EP   2262173   12/2010

OTHER PUBLICATIONS

G. Androulidakis et al., "Improving network anomaly detection via selective flow-based sampling", [Online], 2008, pp. 1-11, [Retrieved from Interenet on Jun. 21, 2020], <https://ieeexplore.ieee.org/stamp/stamp.jsp?arnumber=4490235> (Year: 2008).*

(Continued)

*Primary Examiner* — Ziaul A Chowdhury
(74) *Attorney, Agent, or Firm* — Ahmann Kloke LLP

(57) ABSTRACT

A method comprises receiving network data from a network traffic monitoring platform of an enterprise network, the network data identifying communication between entities, analyzing the network data to identify applications, and comparing at least a first quality based on the communication between at least two of the plurality of entities to a first threshold to identify at least one application, receiving a request to suspend the application discovery process and creating a bookmark of the last network data received from the network traffic monitoring platform, the request to suspend the application discovery process being sent when one of a plurality of suspension trigger conditions is satisfied, receiving a request to reinitiate the application discovery process and receiving the network data from the network traffic monitoring platform at the bookmark, and creating a discovered application entry from the at least one identified application of the enterprise network.

20 Claims, 10 Drawing Sheets

(51) Int. Cl.
*G06F 9/455* (2018.01)
*G06F 9/50* (2006.01)
*H04L 12/26* (2006.01)
*H04L 29/08* (2006.01)

(52) U.S. Cl.
CPC ............ *H04L 41/06* (2013.01); *H04L 41/065* (2013.01); *H04L 41/0681* (2013.01); *H04L 41/0896* (2013.01); *H04L 41/145* (2013.01); *H04L 43/026* (2013.01); *H04L 43/0876* (2013.01); *H04L 43/12* (2013.01); *H04L 43/16* (2013.01); *H04L 47/2441* (2013.01); *H04L 47/2483* (2013.01); *H04L 67/1097* (2013.01); *G06F 2009/4557* (2013.01); *G06F 2009/45591* (2013.01); *G06F 2009/45595* (2013.01); *H04L 67/10* (2013.01)

(58) Field of Classification Search
CPC ....... G06F 2009/45595; H04L 41/0233; H04L 41/06; H04L 41/065; H04L 41/0681; H04L 41/0896; H04L 41/145; H04L 43/026; H04L 43/0876; H04L 43/12; H04L 43/16; H04L 47/2441; H04L 47/2483; H04L 67/1097; H04L 67/10
See application file for complete search history.

(56) References Cited

U.S. PATENT DOCUMENTS

| | | | |
|---|---|---|---|
| 8,065,133 | B1 | 11/2011 | Asbridge |
| 9,026,687 | B1 | 5/2015 | Govande |
| 10,044,566 | B1 | 8/2018 | Grisco |
| 10,216,812 | B2 * | 2/2019 | Witkop ................. G06F 21/629 |
| 10,505,959 | B1 | 12/2019 | Wang |
| 2002/0156883 | A1 | 10/2002 | Natarajan |
| 2003/0167327 | A1 | 9/2003 | Baldwin |
| 2005/0081208 | A1 | 4/2005 | Gargya |
| 2005/0229182 | A1 | 10/2005 | Grover |
| 2006/0184626 | A1 | 8/2006 | Agapi |
| 2006/0242647 | A1 | 10/2006 | Kimbrel |
| 2006/0271677 | A1 | 11/2006 | Mercier |
| 2008/0019499 | A1 | 1/2008 | Benfield |
| 2009/0016236 | A1 | 1/2009 | Alcala |
| 2009/0106256 | A1 | 4/2009 | Safari |
| 2009/0241113 | A1 | 9/2009 | Seguin |
| 2009/0259749 | A1 | 10/2009 | Barrett |
| 2009/0319580 | A1 | 12/2009 | Lorenz |
| 2011/0225017 | A1 | 9/2011 | Radhakrishnan |
| 2012/0030352 | A1 | 2/2012 | Sauma Vargas |
| 2012/0044811 | A1 | 2/2012 | White |
| 2012/0131593 | A1 | 5/2012 | DePetro |
| 2012/0192197 | A1 | 7/2012 | Doyle |
| 2013/0060932 | A1 * | 3/2013 | Ofek ....................... H04L 41/12 709/224 |
| 2013/0117847 | A1 | 5/2013 | Friedman |
| 2013/0152200 | A1 | 6/2013 | Alme |
| 2014/0112187 | A1 | 4/2014 | Kang |
| 2014/0331277 | A1 | 11/2014 | Frascadore |
| 2015/0074251 | A1 | 3/2015 | Tameshige |
| 2016/0004475 | A1 | 1/2016 | Beniyama |
| 2016/0044035 | A1 | 2/2016 | Huang |
| 2016/0119234 | A1 | 4/2016 | Valencia Lopez |
| 2016/0359897 | A1 * | 12/2016 | Yadav ................. G06F 16/162 |
| 2017/0123849 | A1 | 5/2017 | Tian |
| 2017/0168866 | A1 | 6/2017 | Kono |
| 2017/0317899 | A1 | 11/2017 | Taylor |
| 2018/0115585 | A1 | 4/2018 | Rubakha |
| 2018/0165451 | A1 * | 6/2018 | Kawakita ............ G06F 9/45558 |
| 2018/0324045 | A1 | 11/2018 | Grisco |
| 2019/0065230 | A1 | 2/2019 | Tsirkin |
| 2019/0089617 | A1 * | 3/2019 | Raney .................. H04L 41/147 |
| 2019/0163589 | A1 | 5/2019 | McBride |
| 2019/0243671 | A1 | 8/2019 | Yadav |

OTHER PUBLICATIONS

Andreas Kind et al., "Histogram-Based Traffic Anomaly Detection", [Online], 2009, pp. 110-121, [Retrieved from Interenet on Jun. 21, 2020], <https://ieeexplore.ieee.org/stamp/stamp.jsp?arnumber=5374831> (Year: 2009).*

Wei Wang et al., "Network Traffic Monitoring, Analysis and Anomaly Detection", [Online], 2011, pp. 6-7, [Retrieved from Interenet on Jun. 21, 2020], <https://ieeexplore.ieee.org/stamp/stamp.jsp?arnumber=5772054> (Year: 2011).*

Tomas Cejka et al., "NEMEA: A Framework for Network Traffic Analysis", [Online], 2016, pp. 195-201, [Retrieved from Interenet on Jun. 21, 2020]<https://ieeexplore.ieee.org/stamp/stamp.jsp?arnumber=7818417> (Year: 2016).*

International Application No. PCT/US2018/067760, International Search Report and Written Opinion dated Mar. 8, 2019.

International Application No. PCT/US2019/058976, Search Report and Written Opinion dated Mar. 25, 2020.

International Application No. PCT/US2019/059282, Search Report and Written Opinion dated Apr. 7, 2020.

Chandramouli, Ramaswamy, "Security Assurance Requirements for Hypervisor Deployment Features," Seventh International Conference on Digital Society, Feb. 2013.

Ramamoorthy, S. et al. "A Preventive Method for Host Level Security in Cloud Infrastructure," Proceedings of the 3rd International Symposium on Big Data and Cloud Computing Challenges, Feb. 2016.

Sethi, Chhabi et al., "Trusted-Cloud: A Cloud Security Model for Infrastructure as a Service (IaaS)," International Journal of Advanced Research in Computer Science and Software Engineering, vol. 6, No. 3, Mar. 2016.

Urias, Vincent E. et al., "Hypervisor Assisted Forensics and Incident Response in the Cloud," 2016 IEEE International Conference on Computer and Information Technology, Dec. 2016.

* cited by examiner

SYSTEM AND METHOD OF APPLICATION DISCOVERY

CROSS-REFERENCE TO RELATED APPLICATIONS

The present application claims benefit of U.S. Provisional Patent Application Ser. No. 62/611,892, filed Dec. 29, 2017 and entitled "Systems and Methods for Performance Management of Data Infrastructure," which is incorporated by reference herein. In addition, the following applications filed on Dec. 27, 2018 are incorporated by reference herein: U.S. Nonprovisional patent application Ser. No. 16/234,384 entitled "Systems and Methods of Application-Aware Improvement of Storage Network Traffic," U.S. Nonprovisional patent application Ser. No. 16/234,402 entitled "System and Method of Flow Source Discovery," U.S. Nonprovisional patent application Ser. No. 16/234,424 entitled "System and Method of Dynamically Assigning Device Tiers Based on Application," U.S. Nonprovisional patent application Ser. No. 16/234,440 entitled "Systems and Methods of Discovering and Traversing Coexisting Topologies," and U.S. Nonprovisional patent application Ser. No. 16/234,452 entitled "System and Method of Cross-Silo Discovery and Mapping of Storage, Hypervisors and Other Network Objects."

FIELD OF THE INVENTION

Embodiments of the present invention related generally to discovering applications on an enterprise system.

BACKGROUND

Complexity of enterprise networks has increased to a point where even information technology (IT) administrators may not be aware of the computing and storage resources on which mission-critical applications of the organization are running on.

Enterprise networks consist of computing and storage resources designed to run business-related applications of an organization. Applications of the enterprise network, include, for example, email service, web service, database, customer relationship management (CRM), data file, virtual desktop infrastructure (VDI), enterprise resource planning (ERP), and the like.

Enterprise networks are increasingly moving towards a combination of on-premise and cloud-based infrastructure, making the ability to determine computing and storage resources associated with business-related application more difficult. Corporations demands acceptable levels of performance, reliability, redundancy, and security from its computing and storage devices. One way to achieve performance, reliability, and redundancy is to provide more resources than the computing environment would ever need. Unfortunately, the cost of information technology equipment, software and personnel can be prohibitively expensive, and would run contrary to an overall goal of an enterprise of profitability. Every corporation must strike a balance between their the cost of additional computing and storage versus performance, reliability and redundancy benefits of the additional computing and storage resources.

One way for IT administrators to monitor aspects of the increasingly complex enterprise network is with assistance from a wide variety of standalone and integrated software tools available to aid in the monitoring various aspects of the enterprise network. These tools include standalone software such as IT management software and application performance software. For example, routers may be integrated with a network protocol (e.g., a traffic analysis platform) which provides the ability to collect IP network traffic as it enters or exits the router. Servers may be integrated with software to provide the ability to collect information regarding hosts and storage device communicating with the server. However, each standalone or integrated software may capture data regarding different aspects of the enterprise network. For example, IP network traffic may provide data such as the speed of each hop from the router to a host, but may not capture data regarding attributes of the host such as the operating system running on the host, or CPU usage of the host. Furthermore, data provided by each standalone or integrated software may be viewed on their own platform, and may be isolated from one another. This may make pin pointing the reason for a change in the reliability or performance of a mission critical application such as VDI, more difficult.

For example, when a user of the enterprise network complains of slow response of the virtual desktop application of the enterprise network, the IT administrator may run a diagnostic using storage performance monitoring tools on one or more storage resources on which the VDI application is known to be running. The storage performance monitoring tool may determine that no storage performance problem exist. A common solution to the issue may be to increase the storage array capacity of the enterprise network, which may not result in an improvement in response time of the storage array. The software integrated in routers of the enterprise network may not be able to pin point reason for the slow response of the VDI application, since this software would only have access data regarding traffic on the routers, and not the performance of other entities of the VDI application connected to the routers.

SUMMARY

An example system may comprise one or more processors. The memory containing instructions to control the one or more processors to initiation of an application discovery process of an enterprise network, the application discovery process comprising receiving network data from a network traffic monitoring platform, the network traffic monitoring platform being in communication with the enterprise network, the network data identifying communication between entities of the enterprise network, analyzing the network data to identify a plurality of applications of the enterprise network, the analysis of the network data including identifying from the network data the plurality of entities that communication with each other and comparing at least a first quality based on the communication between at least two of the plurality of entities to a first threshold to identify at least one application of the plurality of applications of the enterprise network, receiving a request to suspend the application discovery process and creating a bookmark of the last network data received from the network traffic monitoring platform, the request to suspend the application discovery process being sent when one of a plurality of suspension trigger conditions is satisfied, receiving a request to reinitiate the application discovery process and receiving the network data from the network traffic monitoring platform at the bookmark, the request to reinitiate the application discovery process when one of a plurality of reinitiation trigger condition is satisfied and creating a discovered application entry from the at least one identified application of the enterprise network.

In various embodiments the application discovery process further comprising receiving application data from a first application performance platform, the first application performance platform being in communication with the enterprise network and receiving application data from a second application performance platform, the second application performance platform being in communication with the enterprise network. In some embodiments, the first quality being a duration that at least two entities of the enterprise network are in communication with each other and the first threshold being a communication duration threshold, or the first quality being an amount of data traffic that at least two entities of the enterprise network are in communication with each other and the first threshold being a data traffic threshold, or the first quality being a match between prefixes of names of the plurality of entities of the enterprise network and the first threshold being a name matching threshold, or the first quality being a creation time of entities of the enterprise network, the first threshold being entities introduction threshold.

In some embodiments, the entities of the enterprise network includes storage devices or switches. The application discovery process further comprising wherein the first application performance platform includes Netflow. In various embodiments, the first application performance platform includes probes configured to monitor data traffic between entities of the enterprise network.

An example method comprises receiving network data from a network traffic monitoring platform, the network traffic monitoring platform being in communication with the enterprise network, the network data identifying communication between entities of the enterprise network, analyzing the network data to identify a plurality of applications of the enterprise network, the analysis of the network data including identifying from the network data the plurality of entities that communication with each other and comparing at least a first quality based on the communication between at least two of the plurality of entities to a first threshold to identify at least one application of the plurality of applications of the enterprise network, receiving a request to suspend the application discovery process and creating a bookmark of the last network data received from the network traffic monitoring platform, the request to suspend the application discovery process being sent when one of a plurality of suspension trigger conditions is satisfied, receiving a request to reinitiate the application discovery process and receiving the network data from the network traffic monitoring platform at the bookmark, the request to reinitiate the application discovery process when one of a plurality of reinitiation trigger condition is satisfied and creating a discovered application entry from the at least one identified application of the enterprise network.

An example computer program product comprising a computer readable storage medium having program code embodied therewith, the program code executable by a computing system to cause the computing system to perform receiving network data from a network traffic monitoring platform, the network traffic monitoring platform being in communication with the enterprise network, the network data identifying communication between entities of the enterprise network, analyzing the network data to identify a plurality of applications of the enterprise network, the analysis of the network data including identifying from the network data the plurality of entities that communication with each other and comparing at least a first quality based on the communication between at least two of the plurality of entities to a first threshold to identify at least one application of the plurality of applications of the enterprise network, receiving a request to suspend the application discovery process and creating a bookmark of the last network data received from the network traffic monitoring platform, the request to suspend the application discovery process being sent when one of a plurality of suspension trigger conditions is satisfied, receiving a request to reinitiate the application discovery process and receiving the network data from the network traffic monitoring platform at the bookmark, the request to reinitiate the application discovery process when one of a plurality of reinitiation trigger condition is satisfied and creating a discovered application entry from the at least one identified application of the enterprise network.

DETAILED DESCRIPTION

Various embodiments provide customers to deliver on complex requirements of their application infrastructure. Systems discussed herein may provide insights into the performance and availability of the end-to-end system—across physical, virtual and cloud environments. The system may intelligently capture, correlate, and/or analyze both breadth and depth of data, transforming data regarding an assets/applications of an enterprise network into answers and actionable insights. This allows the promotion of performance-based Service Level Agreements, changing the value of the infrastructure. With these insights, user may be able to take control of their environment, accurately inform collaborative dialogues, and drive business outcomes.

An application discovery system may be used to give IT administrators and operators an awareness of applications and related network infrastructure. Application discovery may obtain real-time views of the infrastructure that is relevant and important to the network and usage of the network. In addition, the application discovery system may determine entities of the infrastructure where important applications are located and monitor application behavior and their effect on infrastructure resources. Entities are logical and intuitive groupings of systemwide devices and workloads that may be based on function, correlation, and/or interdependency. Entities enable users to logically group system-wide resources, from physical devices to application workloads, in order to provide the authoritative insights required to understand how resources and applications are performing. IT teams may configure entities to show all of the resources supporting a specific application, business unit, or tier of service.

The application discovery process can determine the health, utilization and performance data for storage controllers, ports and volumes. In some embodiments, the application discovery process provides real-time visibility into the performance, health and utilization of applications across physical, virtual, and cloud computing environments.

Figure 1:
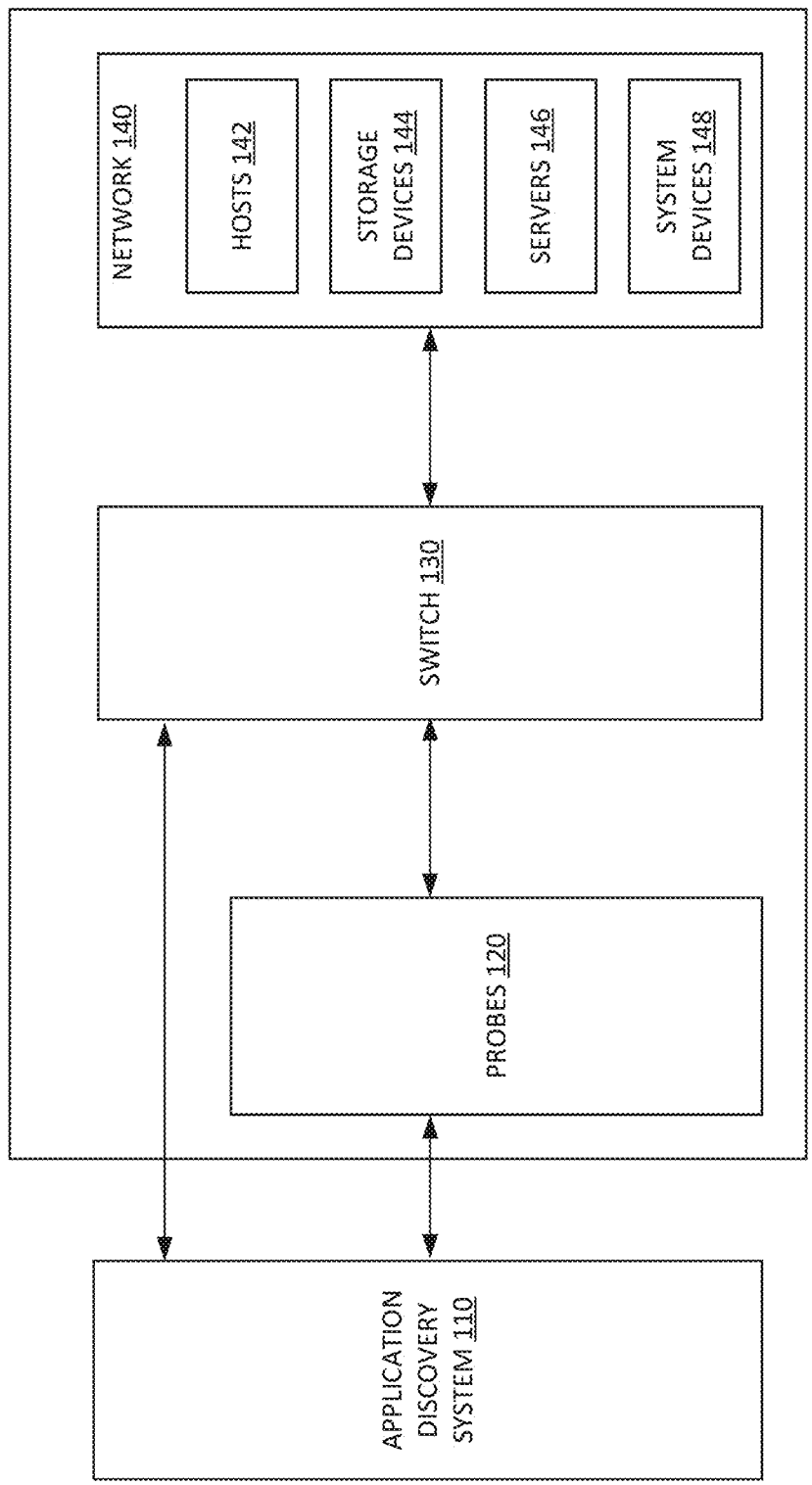
FIG. 1 depicts a block diagram of an enterprise system capable of discovering applications running on network entities of the enterprise system.

FIG. 1 depicts a block diagram of an enterprise system capable of discovering applications running on network entities of the enterprise system. The enterprise system may include an application discovery system 110 in communication with probes 120 and a switch 130. The probes 120 and switch 130 may be in communication and the switch 130 may communicated with a network 140 including hosts 142, storage devices 144, servers 146, and system devices 148.

The process of application discovery may include the application discovery system 110 implementing secure shell (SSH), or windows management instrumentation (WMI) to communicate with entities of the enterprise network 140. The application discovery system may take information received from SSH and WMI protocols, and apply heuristics to suggest from heuristic implications what applications could exist. For example, the application discovery system 110 may determine that entities of the enterprise network 140 which communication with each other at regular intervals throughout the day and were introduced to the enterprise network 140 at around the same time may be a part of the same application.

In some embodiments, the process of application discovery includes integrating information from software platforms which manages or monitors the performance of applications on the enterprise network 140. For example, application discovery system 110 may take information regarding applications discovered by ServiceNow along with information from SSH or WMI to obtain a more accurate topology of entities involved in applications of the enterprise network 140. The enterprise may choose to subscribe software platforms such as ServiceNow and AppDynamics to monitor entities of the enterprise network 140 known to be associated with business critical applications.

In some embodiments, the application discovery system 110 identifies entities of an enterprise network, integrates data from software platforms already subscribed by the enterprise network 140, and retrieves data from probes to monitor various entities of the enterprise network. In some embodiments, the probes are hardware probes, software probes, or a combination of the two. In various embodiments, the probes are plug-ins that come built in with various network monitoring platforms. In some embodiments, a probe may include an optical splitter which provides a copy of data passing through a fiber optic channel of the enterprise network 140 without affecting the integrity of the data. The fiber optic channel connecting storage devices with servers of the enterprise network. The copy may be used for real time performance monitoring of the traffic travelling through the fiber optic channel. The information obtained from the probes may suggest from heuristic implications that applications could exist on the enterprise network 140.

It will be appreciated that platforms such as ServiceNow and AppDynamics may not be able to discover applications running on entities of the enterprise network 140 which are not monitored by those platforms. Furthermore, ServiceNow, AppDynamics and the like may not be able to recognize an entity added to an application subsequent to the discovery of the application by ServiceNow, unless the enterprise subscribes the added entity of the enterprise network 140. In addition, ServiceNow may not be able to recognize applications running on entities not subscribed to ServiceNow which has an effect on a business critical application. For example, a host of enterprise network 140 which is not subscribed to ServiceNow may be in communication with a server that is part of a business critical application, such as web server. The host may be running an out-of-date version of a long forgotten application and is in constant communication with the server of web server and taking up the utilization of an entity of a business critical application. The use of application discovery on entities of the enterprise network 140, regardless of whether or not the entity is subscribed to ServiceNow, AppDynamics or other software platforms which manages or monitors the performance of applications on the enterprise network 140, may aid in discovering inefficient software and hardware components of the enterprise network 140 and obtain a better understanding of where applications live on the infrastructure of the network and model and monitor application behavior and their effect on infrastructure resources.

In some embodiments, the application discovery system 110 may update or modify a set of applications discovered by the IT management or application performance software platforms. For example, ServiceNow may determine that an email service of the enterprise includes eight entities communicating with each other in a particular configuration. The application discovery system 110 may create and store a discovered application entry which includes attributes (e.g., metrics) of the discovered application such as a suggested name of the discovered application as well as attributes associated with the eight entities which make up the discovered application. Through SSH or WMI commands on the entities of the enterprise network 140, heuristic implications of the application discovery system 110 may suggest or otherwise indicate that the enterprise network 140 includes an email service comprising nine entities with eight of the nine entities communications in the same configuration as the configuration from the email service discovered by ServiceNow. The ninth entity may not be subscribed to by ServiceNow, or the ninth entity may have been added to the enterprise network 140 after the IT management or application performance software platform was introduced to the enterprise network 140. In some embodiments, the application discovery system 110 may create a discovered application entry which includes attributes associated with the nine entities which make up the discovered application and over write the previous discovered application entry of the email service with eight entities in the datastore of the application discovery system 110.

In various embodiments, the application discovery system 110 does not overwrite the second discovered application entry for the email service with nine entities, but reports both discovered application entries, and have a system or network professional decide which discovered application entry is correct, or the one to keep. In some instances, the application discovery system 110 may send a request to ServiceNow to update the attributes associated with the application as well as the entities associated with the application.

The process of discovering applications can be time consuming and take up enterprise network resources and cause users on the enterprise network to experience slow response time. For example, if network 140 comprised 100,000 entities, the SSH or WMI component of the application discovery process may involve the SSH or WMI command between the application discovery system 110 and the 100,000 entities. It is advantageous to schedule application discovery to a time frame when the servers and other entities of the enterprise network are not experiencing a high level of utilization or when critical functions are not impacted (or impacted marginally).

In one example, an IT administrator may schedule an application discovery process to take place during particular times of the day or week. The application discovery process may be paused. The application discovery system 110 may bookmark the last discovered application or the last piece of data received from SSH or WMI command. When the application discovery process resumes, the application discovery system 110 may resume the process at the bookmarked state. In another example, the application discovery system 110 may determine that an application discovery process can commence on an entity of the enterprise network, such as a server, if an entity utilization less than an entity utilization threshold.

The application discovery system 110 may determine that the application discovery process of an entity of the enterprise network 140 is suspended when the entity utilization is greater than the entity utilization threshold. In some embodiments, the entity utilization threshold which triggers the commencement of the application discovery process and the entity utilization threshold which triggers the suspension of the application discovery process are different.

In some embodiments, the application discovery process is complete, or is suspended when one of a plurality of trigger conditions is satisfied. Trigger conditions may include a scheduled discovery period has passed, the application discovery system 110 receives input from the user of the enterprise network 140 to commence or suspend the application discovery process, or the utilization threshold of one or more entities of the enterprise network 140 is reached.

The application discovery system 110 may receive information from a subset or all of the entities of the enterprise network for a predetermined period of time. The predetermined period of time may be determined by a user of the enterprise network 140 such as the IT administrator or authorized device of the enterprise network 140. The IT administrator or authorized device of the enterprise network 140 may schedule the application discovery process and determine the start, end and duration of the application discovery process. In various embodiments, the subset of the entities of the enterprise network is determined by the IT administrator, authorized device of the enterprise network 140, or by the application discovery system 110.

The application discovery system 110 may receive input from the user of the enterprise network 140 to commence or suspend the application discovery process. In some embodiments, the application discovery system 110 is configured to discover applications on the enterprise network 140. The IT administrator of the enterprise network 140 may schedule an application discovery process to occur during specified times of the day and/or during particular days of the week. The application discovery system 110 may receive a request for an initial application discovery of the enterprise network 140. This request may occur after the application discovery system 110 is first installed into the enterprise network 140 and may occur on command and/or at specified times/dates.

Once initiated, the initial application discovery process may continue until it is completed or paused. The application discovery system 110 may run subsequent analysis according to the schedule inputted by the IT administrator or authorized device of the enterprise network 140. Application discovery processes subsequent to the initial application discovery may involve the same steps, however, an initial application discovery process may require more time to complete since subsequent application discovery process may ignore applications which have been previously discovered.

In some embodiments, the application discovery system 110 discovers that a particular application has not changed in the last predetermined number of iterations (e.g., ten) of the application discovery process. In such a case, the application discovery system 110 may choose to identify the application periodically. As such, the application discovery system 110 may skip analysis or determination of previously discovered applications that rarely change.

In various embodiments, the number of iterations which triggers the periodic discovery of an application, such as ten in the above example, may change according to attributes (e.g., metrics) of the particular application, such as tier or criticality of the particular application. For example, a more critical application may require discovery or identification during every iteration of the application discovery process, to ensure that entities associated with the critical application are monitored, while a less critical application may not require discovery during every iteration of the application discovery process.

In one embodiment, once initiated, the application discovery system 110 may suspend the initial application discovery process when a scheduled application discovery time frame has elapsed. The application discovery process may be suspended until a subsequent scheduled application discovery time frame has begun. In some embodiments, the initial application discovery process is suspended when the entity utilization of one or more (e.g., a predetermined number of) entities of the enterprise network is greater than an entity utilization threshold. In various embodiments, the initial discovery process is suspended when the application discovery system 110 receives an input from the IT administrator or authorized device of the enterprise network 140 to suspend the application discovery process.

The probes 120 may comprise software probes. In some embodiments, some or all of the software probes may be a part of the application discovery system 110. In various embodiments, some or all of the hardware or software probes may be part of the enterprise network 140. The probes 120 may divert at least a portion of the signals being transmitted along each pathway between the application discovery system 110, the switch 130 and various entities of the enterprise network 140.

The probes 120 may include hardware and/or software probes in some embodiments. The hardware probes may include, for example, networked attached storage (NAS) probes or ProbeNAS, capable of monitoring network file system (NFS) or server message block (SMB) conversations and fiber channel (FC) probes capable of observing FC conversations or ProbeFC. The ProbeNAS observations between initiators, targets and logical unit number (LUN) (ITL) conversations and automatically places the devices and switches, links based on the observed conversations. The data retrieved by the ProbeNAS may include the IP address, type of probe, version of the firmware associated with the probe, network address, and domain name system (DNS). The data retrieved by the ProbeNAS or the ProbeFC may suggest from heuristic implications that applications could exist on the enterprise network 140.

In various embodiments, ProbeNAS observe NFS and SMB conversations and capture metrics from the observed conversations. Metrics that can be captured include source/destination IP address, destination ethernet ports of; storage arrays, storage controllers and I/O Modules. This information may be used to discover applications, determine alarms, reporting and analytics.

In some embodiments, the probes 120 may receive information from routers integrated with a network protocol, such as Netflow, to provide the ability to collect IP network traffic as it enters or exits the router. NetFlow may assist in the application discovery process by integrating data obtained by NetFlow may be integrated with the application discovery system 110. Software integrated into servers may provide the ability to collect information regarding hosts and storage device communicating with the server. Using this information from routers and servers, the application discovery system 110 may suggest from heuristic implications that an application could exist.

The software probes may include probes to establish Windows (WMI) and Linux (SSH) credential sets for specified hosts. Integration of WMI and SSH offers visibility into Windows and UNIX physical and virtual hosts. The data retrieved by the software probes may include IP address, probe type, date and time that the probe was last discovered, status of the probe, number of CPUs, operating system (OS) version, applications running on the host.

The switch 130 may provide communication between any of the enterprise network 140, the probes 120 and the application discovery system 110. The switch 130 may use packet switching to receive, process and forward data from a source device to a destination device. In various embodiments, the switches 130 may include a switch fabric. A switch fabric may be a basic topology of the layout of how the network is connected to switch traffic. The switch fabric may use packet switching to receive, process and forward data from a source device to a destination device.

The enterprise network 140 may be any network or combination of networks run and, operated, or own by an enterprise. The enterprise network 140 may, for example, comprise hosts 142, storage devices 144, server 146 and system devices 148. Each of the hosts 142 may be utilized by members of the enterprise and/or perform functions for the enterprises. In various embodiments, each of the plurality of hosts 142 is an instance of an operating system, in some examples, a physical computer managed by Microsoft Windows may be one of the plurality of plurality of hosts 142. In one embodiment, hosts may include one or more virtual machines. In various embodiments, hosts 142 may include instances of UNIX, Red Hat, Linux and others.

Storage devices 144 of the enterprise network 140 is a storage system that stores data. In one embodiment, the storage devices 144 is a disk array. In one embodiment, the storage device is a tap library or an optical jukebox. In some embodiments, the storage device is a storage array (e.g., SAN). In various embodiments, the storage device is cloud storage.

The servers 146 may include any servers for files, virtual machines, email, web, security, applications, and/or the like. The servers 146 may include any type of operating system and may be hardware, software, virtual, or a combination of hardware, software, and/or virtual.

The system devices 148 may include other entities of the enterprise network 140 such as third-party software platforms subscribed to by the enterprise network 140. In various embodiments, the third-party software platform includes IT management software such as ServiceNow or an application performance integration platform such as AppDynamics.

Figure 2:
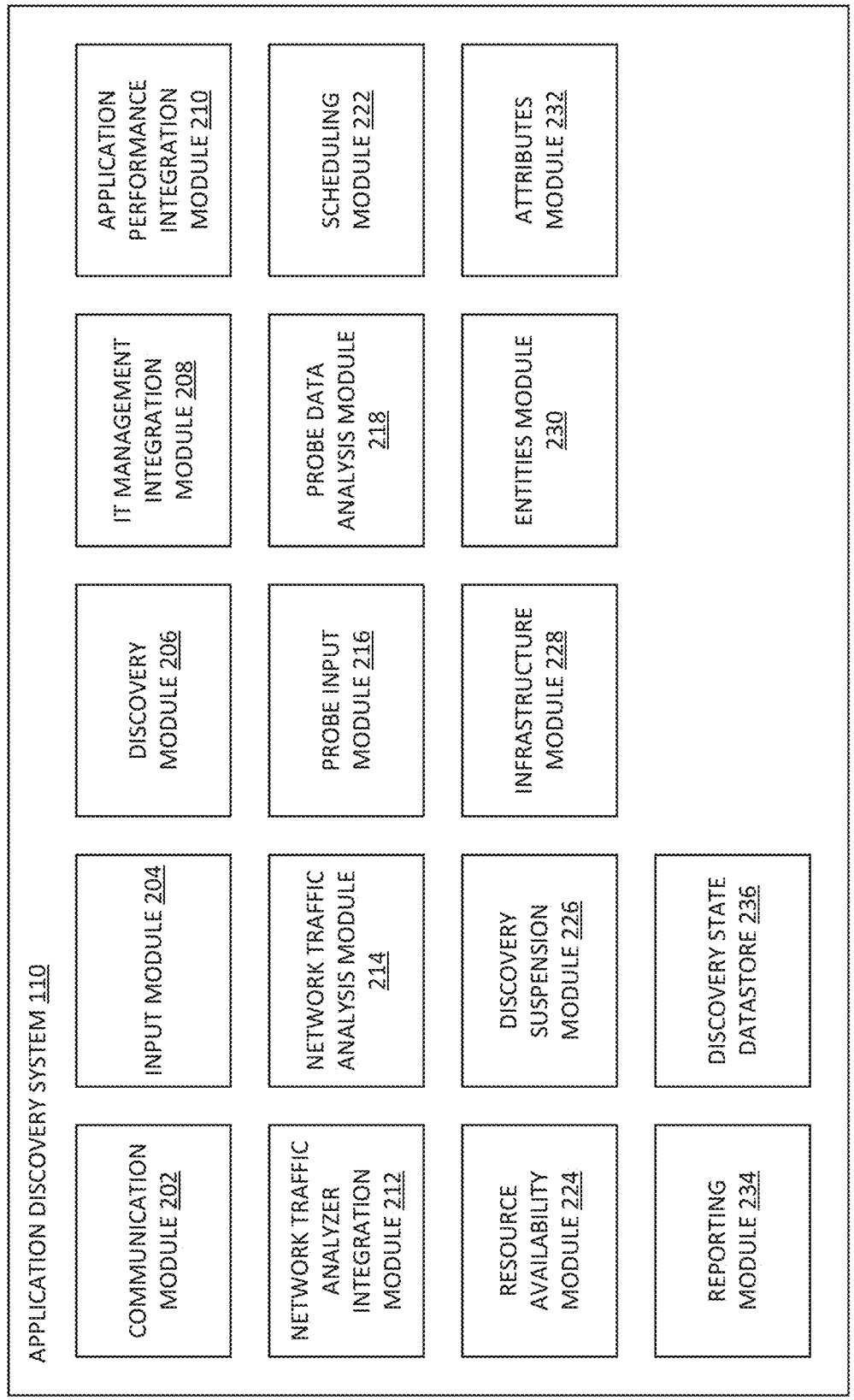
FIG. 2 depicts a block diagram of an example of an application discovery system according to some embodiments.

FIG. 2 depicts a block diagram of an example of an application discovery system 110 according to some embodiments. The application discovery system 110 depicted in FIG. 2 includes a communication module 202, input module 204, discovery module 206, IT integration module 208, application performance integration module 210, network traffic analyzer integration module 212, network traffic analysis module 214, probe input module 216, probe data analysis module 218, scheduling module 222, resource availability module 224, discovery suspension module 226, entities module 228, infrastructure module 230, attributes module 232, reporting module 234, and discovery state datastore 236.

The communication module 202 may send and receive requests or data between any of the application discovery system 110, the probes 120, the switch 130, and/or the enterprise network 140. The communication module 202 may receive a request from the IT administrator of the enterprise network 140 or an authorized device to schedule an application discovery process to start at a specified date/time (e.g., day of the week and/or time of the day and/or duration). The communication module 202 may send the request received from the IT administrator or authorized device to the scheduling module 222. In some embodiments, the communication module 202 is configured to receive probe data from the probes 120.

In some examples, the communication module 202 may receive data analyzed by the network traffic analysis module 214. The data analyzed by the network traffic analysis module 214 may include potential applications discovered on the enterprise system and metadata associated with the discovered application. The metadata may include attributes such as the name of the application, the number of entities associated with the discovered application as well as attributes of each of the entities of the associated with the discovered application. In some embodiments, the metadata includes the network port of each of the entities associated with the discovered application.

The input module 204 may receive a request to initiate the application discovery process from an IT administrator or authorized device of the enterprise network 140. In some embodiments, the input module 204 is configured to send the application discovery process initiation request the discovery module 206. The input module 204 may send a request to the discovery suspension module 226 to commence or suspend the application discovery process.

The input module 204 may receive information from IT administrator or authorized device of the enterprise network 140. The received information may include a list including applications known to the user. The received information may also include a second list including all or some of the entities of the enterprise network 140, as well as metadata associated with entities of the enterprise network 140 such as a network tier associated with the entity, name of the entity or type of entity. In some embodiments, metadata associated with entities of the enterprise network 140 may be different depending on the type of entity. Entities of the enterprise network 140 represent the physical and virtual entities of the enterprise network, and may include applications, compute devices, network elements and storage elements.

In some embodiments, the input module 204 is configured to receive a schedule of the application discovery process. The schedule of the application discovery process may include start times/dates, suspend times/dates, criteria of conditions went to suspend times/dates, and the like.

Figure 9:
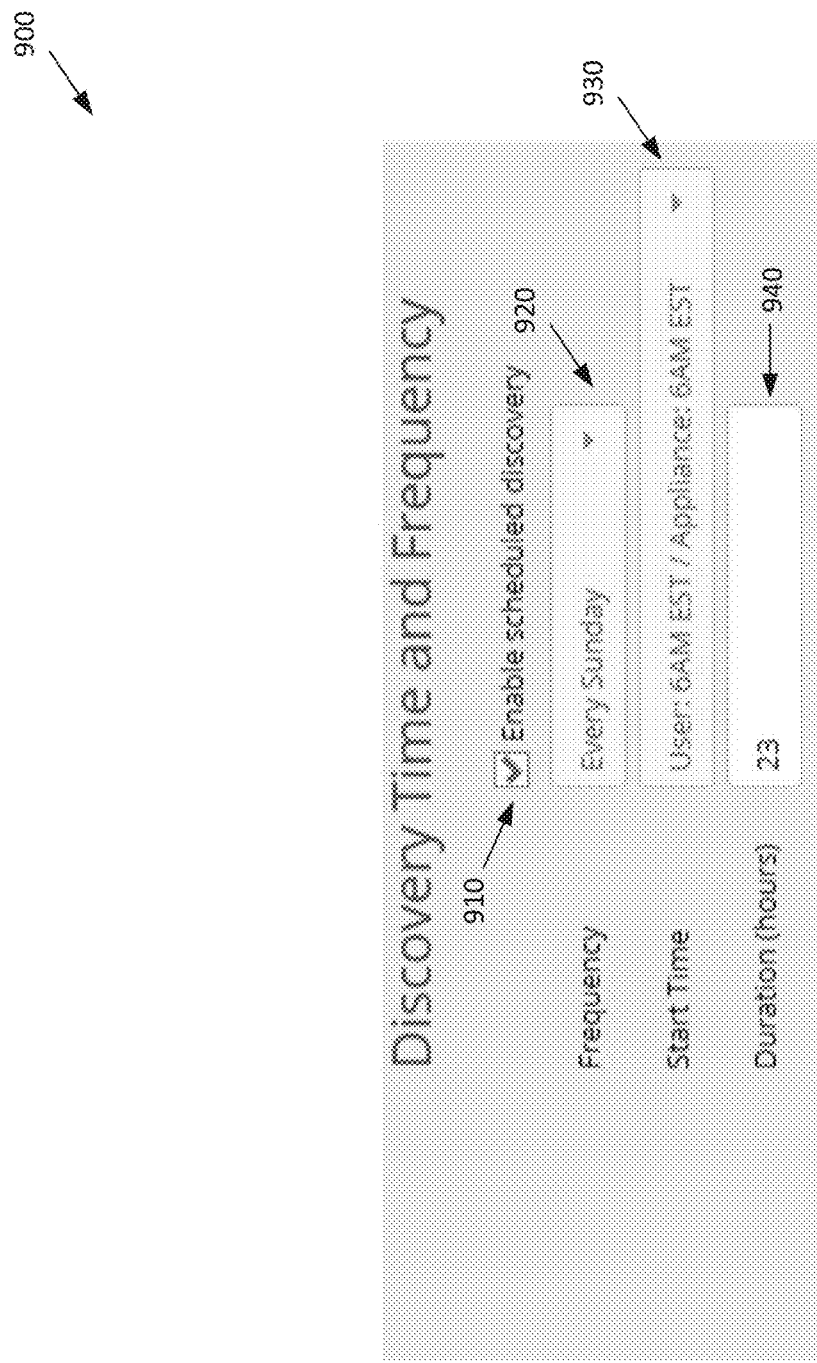
FIG. 9 depicts an example application discovery interface according to some embodiments.

The input module 204 may receive the application discovery process schedule from an application discovery interface 900 of FIG. 9. FIG. 9 depicts an example application discovery interface 900 for creating an application discovery process schedule in some embodiments. By interacting with field 910, the application discovery process may be scheduled. In this example, pull-down field 920 may specify the day of the week that the application discovery process may b. A start time of the application discovery process can be chosen using pull-down field 930. A duration, in hours, of a scheduled application discovery process can be chosen using field 940.

In various embodiments, the application discovery process scheduled may be generated based on any number of sources. In some embodiments an authorized device of the enterprise network 140 may provide all or some of the application discovery process schedule. As discussed herein, the application discovery process schedule may include start times and/or dates as well as pause times and/or dates. For example, the schedule may include a specific time and date when application discovery process must be suspended. By suspending the operation discovery process, computational efficiency and scaling may be preserved for other enterprise applications (e.g., high tier enterprise applications). It will be appreciated that certain critical applications are more likely to be run at certain times of the day and/or on certain dates. As such, in order to improve computational efficiency, the application discovery process may be suspended during that time. After that time, the application discovery process schedule may indicate when the application discovery process is to be reinitiated from the point in the application discovery process when it was previously suspended.

The application discovery process schedule may further include criteria to suspend the application discovery process. For example, when one or more networks or hardware systems are above a predetermined threshold of utilization, when certain critical applications require additional resources above an application threshold, when certain critical applications are running, and/or other conditions exist, then the application discovery process may be suspended. Similarly, the criteria may indicate when the application is covering process may be reinitiated from the point of the previous suspension (e.g., when one or more networks or hardware systems are below her predetermined threshold of utilization, when certain critical applications no longer require additional resources above and application threshold, when certain critical applications are no longer running, and/or other conditions).

It will be appreciated that the allegation discovery process schedule may not include such criteria but such criteria may be incorporated within one or more rules that dictate, in part, when the application discovery process may be suspended and reinitiated from the point of the previous suspension.

As the application discovery process continues, new applications and tiers may be discovered. Rules regarding suspension and reinitiation of the application discovery process may be triggered by the newly discovered applications. For example, the application discovery process may discover a first new application with a critical tier level. There may be a rule that pauses the application discovery process when such applications (including a group of applications that share similar characteristics including, in this example, the first application) are running and/or require computational resources above a predetermined threshold. As such, after the first new application is discovered, that execution and/or utilization of that new application may pause the application discovery process. Similarly, if the reinitiated new application is no longer executed, and or that reinitiated new application has utilization below that threshold, then the rule may trigger the application discovery process to reinitiate from the point of last suspension.

Figure 8:
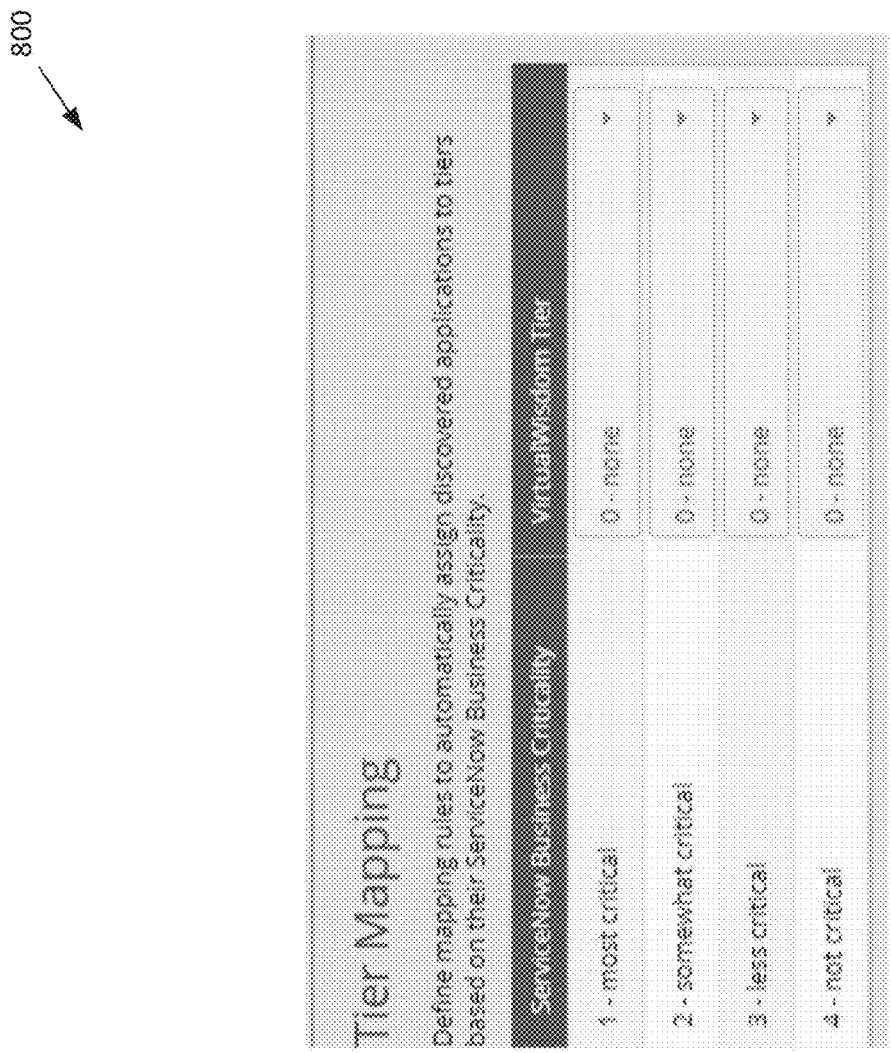
FIG. 8 depicts an example tier mapping interface according to some embodiments.

The input module 204 may receive tier mapping of applications discovered by different software platforms. For example, an application discovered by AppDynamics as a tier 1 business criticality may be remapped to tier 0 in the application discovery system 110. An example tier mapping interface 800 can be found in FIG. 8. FIG. 8 depicts an example tier mapping interface 800 for creating tier mapping of applications in some embodiments. A default setting for tier mapping of all applications discovered by the ServiceNow software platform, for example, is assigned tier 0 of application discovery system 110.

In some embodiments, the tier mapping may be used to prioritize applications discovered by one software platform over another. For example, the IT administrator or authorized device may choose to prioritize applications discovered by ServiceNow over AppDynamics, such that if there is an application conflict between applications discovered by ServiceNow and AppDynamics, the conflict will be automatically resolved by the application discovery system 110 by choosing the application discovered by ServiceNow based on the established prioritization rule.

The discovery module 206 may manage the application discovery process. The discovery module 206 may determine if one of a plurality of trigger conditions (e.g., criteria) have been satisfied to commence or suspend the application discovery process. Trigger conditions may include a scheduled discovery period that, when passed, the input module 204 commences or suspends the application discovery process. Trigger conditions may also include, for example, a utilization threshold of one or more entities of the enterprise network 140 that, when greater than or less than an entity utilization threshold, commences or suspends the application discovery process.

In some embodiments, the application discovery trigger conditions include a utilization of an entity of the enterprise network 140. When the entity utilization of one or more entities of the enterprise network 140 is greater than an entity utilization threshold, the application discovery process may be suspended. For example, the resource availability module 224 may be configured to determine that the entity utilization of one or more entities of the enterprise network is greater than an entity utilization threshold. In response, the resource availability module 224 may send a request to the discovery module 206 to suspend the application discovery process.

The discovery module 206 is configured to send a request to the discovery suspension module 226 when one or more application discovery process trigger conditions is satisfied. In some embodiments, the discovery module 206 may function to send requests to the IT management integration module 208 for data regarding applications discovered by ServiceNow or other IT management platforms. The IT management integration module 208 may receive the request from the discovery module and in response, may send a request to the ServiceNow interface for data regarding applications discovered by ServiceNow. In various embodiments, data associated with applications discovered by ServiceNow, such as name of the application, entities associated with the application and other attributes associated with the application.

In one embodiment, the discovery module 206 is configured to send a request to the network traffic analysis module 214 to analyze the data retrieved by the third-party software platforms integration module from their respective software platform. For example, the discovery module 206 may send a request to the network traffic analysis module 214 to analyze data retrieved from the network traffic analyzer integration module 212.

The discovery module 206 may receive the application discovery process initiation request from the input module 204 and execute the application discovery process. In some embodiments, the discovery module 206 sends a request to infrastructure module 230 which determines the infrastructure of the enterprise network 140 to initiate the infrastructure topology process.

The discovery module 206 may perform any of these operations manually (e.g., by a user interacting with a GUI) and/or automatically (e.g., triggered by one or more of the modules 206-236, discussed herein). In some embodiments, the discovery module 206 comprises a library of executable instructions, which are executable by one or more processors for performing any of the aforementioned management operations. Like the other modules described herein, some or all of the functionality of the discovery module 206 may be implemented and/or included within one or more other modules and/or systems.

The IT management integration module 208 may receive (e.g., from the input module 204) identifications of applications or business services discovered by IT management software platforms subscribed to by the enterprise network 140. In some embodiments, the IT management integration module 208 may receive identifications of applications or business services directly from the IT management software platforms subscribed to by the enterprise network 140.

The enterprise network 140 may subscribe to an IT management software platform such as ServiceNow to monitor some or all of the entities of enterprise network 140. The IT administrator or authorized device may choose to subscribe to monitor entities of the network associated with mission critical applications.

The identified applications or business services may include email, web services, and front end servers. For example, servers, storage devices and hosts associated with an email service for enterprise network 140 may be discovered by ServiceNow. ServiceNow may output entities associated with the email service, along with attributes of the outputted entities. These attributes may include tier mapping of the application associated with the entity. For example, email service may be a tier 0, business critical application, entities associated with email service may be assigned the same tier mapping as a part of their attributes. An entity of the enterprise network 140 may be associated with multiple applications, each with their own associated tier attribute. In some embodiments, an entity associated with multiple applications with different tier mapping may be assigned the lowest tier attribute. For example, when a particular server associated with the email service assigned a tier 0 mapping as well as associated with a SAP application with a tier 1 mapping, the particular server will be assigned the tier 0 mapping (e.g., the more critical level).

The IT management integration module 208 may receive identifications of applications or business services discovered by local and cloud instances of ServiceNow which exist on network 140. The application performance integration module 210 may send a request to the discovery state datastore 236 to create a discovered application entry for applications discovered by ServiceNow.

In various embodiments, the IT management integration module 208 is configured to receive from the input module 204 applications or business services discovered by IT management software platforms other than ServiceNow.

In some embodiments, if the IT management integration module 208 discovers that a particular application has not changed in the last number of iterations of the application discovery process, such that the entities associated with the particular application and the connection between these entities associated with the particular application. In such a case, the IT management integration module 208 may choose to limit some iterations of the discovery process so as to limit analysis of connections between known entities and known applications. In various embodiments, the number of iterations which triggers the periodic discovery of an application may change according to attributes of the particular application, such as tier or criticality of the particular application.

The application performance integration module 210 may receive from the input module 204 identifications of applications or business services discovered by an application performance software platform such as AppDynamics. In some embodiments, the application performance integration module 210 may receive identifications applications or business services directly from the application performance software platforms subscribed to by the enterprise network 140.

The enterprise network 140 may subscribe to an application performance software platform such as AppDynamics to monitor some or all of the entities of enterprise network 140. The enterprise may choose to subscribe to monitor entities of the network associated with mission critical applications. Application performance software platforms manages the performance of applications of the network. AppDynamics assist in analyzing, optimizing and predicting bottlenecks in the enterprise network 140 by monitoring the performance of applications in the network.

The application performance integration module 210 may send a request to the discovery state datastore 236 to create a discovered application entry for applications discovered by AppDynamics. In various embodiments, application performance integration module 210 is configured to receive from the input module 204 applications or business services discovered by other application performance software platforms.

For example, AppDynamics may provide entity identifications associated with applications, along with attributes associated with the entit(ies). These attributes may include tier mapping of the application associated with the entity. For example, email service may be a tier 0, business critical application, entities associated with email service may be assigned the same tier mapping as a part of their attributes. An entity of the enterprise network 140 may be associated with multiple applications, each with their own associated tier attribute. In some embodiments, an entity associated with multiple applications with different tier mapping may be assigned the lowest tier attribute. For example, particular server associated with the email service, which is assigned a tier 0 mapping is also associated with a SAP application with a tier 1 mapping, the particular server will be assigned the tier 0 mapping.

In some embodiments, if the application performance integration module 210 discovers that a particular application has not changed in the last number of iterations of the application discovery process, such that the entities associated with the particular application and the connection between these entities associated with the particular application. In such a case, the application performance integration module 210 may choose to identify or discover the application periodically. In various embodiments, the number of iterations which triggers the periodic discovery of an application may change according to attributes of the particular application, such as tier or criticality of the particular application.

The network traffic analyzer integration module 212 may receive from the input module 204, IP network traffic data from a network traffic software platform, such as NetFlow. In some embodiments, the network traffic analyzer integration module 212 may receive IP network traffic data directly from the network traffic software platform.

Software platforms such as NetFlow logs flow records which, in some embodiments, is a summary of the interaction between two IP addresses. The network traffic analyzer integration module 212 may retrieve flow records between IP addresses of the enterprise network 140 from switches enabled with network traffic software, such as NetFlow. These flow records may be analyzed by the network traffic analysis module 214 to determine possible applications and possible network endpoints.

In some embodiments, the network traffic analyzer integration module 212 is configured to retrieve flow records from NetFlow during scheduled retrieval periods. The scheduled retrieval may be configured by the scheduling module 222. The network traffic analyzer integration module 212 may retrieve, from the input module, flow records from a specific IP address. In some embodiments, these specific IP addresses may represent flow source important to the operations of the enterprise network 140.

The network traffic analysis module 214 may receive the network traffic data from the network traffic analyzer integration module 212. In some embodiments, the network traffic analysis module 214 suggests from heuristic implication that applications could exist. The result of the implications may be include a possible discovered application. For example, the network traffic analysis module 214 may observe that a particular IP address is the flow source/destination to/from thousands of seemingly random IP addresses, and determine that the particular IP address is belongs to an edge device.

The network traffic analysis module 214 may provide information to determine the amount of bandwidth being consumed by a specific IP, entities of the enterprise network 140 using excess bandwidth, entities using a specific network service, and/or network services being used. The network traffic analysis module 214 may send a request to the discovery state datastore 236 to create and store a discovered application entry.

In some embodiments, the network traffic analysis module 214 may analyze network data retrieved from the network traffic analyzer integration module 212. The analysis of the network data including identifying from the network data a set of entities that communicate with each other and comparing at least one quality based on the communication between at least two of the set of entities to a threshold to identify at least one application of the enterprise network. The quality may be, for example, a duration that at least two entities of the enterprise network are in communication with each other and the first threshold being a communication duration threshold. For example, the network traffic analysis module 214 may determine that a storage device and a server, which continuously exchange network data between 8:30 a.m. and 5:30 p.m. every day are a part of an application, which may be greater than the communication duration threshold of 60 minutes.

In some embodiments, the quality may be an amount of data traffic that at least two entities of the enterprise network are in communication with each other and the first threshold being a data traffic threshold. For example, the network traffic analysis module 214 may determine that a particular host and a storage device exchange a large amount of data, such as 200 gigabytes over the course of the application discovery time frame, which may be greater than the data traffic threshold.

The probe input module 216 may retrieve probe data from the probes 120. In various embodiments, the probes 120 may be a part of the enterprise network 140, for example, SSH/WMI may be found in the entities of network 140 and the network traffic software may be found in switch 130.

In some embodiments, the probes 120 may monitor data traffic between entities of the enterprise network.

The probes 120 may include, for example, SAN performance probes and network switch probes. The SAN performance probes may be deployed on connections between storage ports and switches, or on both sides of fabric-based storage virtualizers. In some embodiments, the network switch probes may be an agentless software that utilizes one or more application programming interfaces (APIs) to gather switch performance and link error statistics from the switches (e.g., switch fabric). In some embodiments, a network switch probe may utilize a Storage Management Initiative Specification (SMI-S) (e.g., a standard intended to facilitate the management of storage devices from some SAN vendors). A network switch probe may discover and present to the storage network traffic configuration system entities of the enterprise network 140 to aid in building an infrastructure topology. The entities of the enterprise network 140 may include physical fabric, logical fabric, physical switches, logical switches, blades and switch ports.

In some embodiments, SSH/WMI provides a secure channel over an unsecured network in a client-server architecture, connecting an SSH client with an SSH server. SSH/WMI discovery may look at individual software entities running entities of the enterprise network 140, such as software running on the hosts 142.

In some embodiments, the probes 120 may be a part of the application discovery system 110, such as ProbeNTAP, which monitors data flow to and from the storage devices 144, but is not part of the storage devices 144. In some embodiments, the retrieved data from hardware probes include data retrieved from hardware probe includes: IP address, probe type, network address, and/or speed of the channel. In various embodiments, the retrieve data from software probes include IP address, probe type, sampling rate, status of the probe, number of CPUs, operating system (OS) version, and/or applications running on the host. Data gathered by the hardware and software probes may be used by the application discovery system 110 to discovery entities of the enterprise network 140 and connections between these entities.

The probe data analysis module 218 may receive probe data from the probe input module 216. In some embodiments, the probe data analysis module 218 is configured to suggest heuristic implications of applications that could exist on the enterprise network 140.

For example, the probe data analysis module 218 may receive data from SSH or WMI integration. SSH or WMI. For example, the probe data analysis module 218 may determine that a particular Windows host, which is part of the business critical application of email server is running a different application which takes up the majority of that particular Windows host's CPU, thereby slowing down the email application.

The scheduling module 222 may receive from the input module 204, a schedule of the application discovery process and determine the start time, end time, and time to suspend the application discovery process.

In some embodiments, a user may interact with the example application discovery interface 900 of FIG. 9 to specify the frequency, start time and duration of a scheduled application discovery process. In some embodiments, the scheduling module 222 may receive requests to commence, end or suspend the application discovery process from the resource availability module 224. When the scheduling module 222 determines that a current time equals the scheduled application discovery start time, the scheduling module 222 may send a request to the discovery suspension module 226 to start the application discovery process.

The resource availability module 224 may determine the availability of one or more entities of the enterprise network 140. The resource availability module 224 may periodically inquire the utilization of each entity of network 140 to determine if one of the trigger conditions of the application discovery process is satisfied. In some embodiments, when the resource availability module 224 determines that the resource utilization of a particular entity is less than an entity available threshold, the resource availability module 224 may send a request to the discovery suspension module 226 that the application discovery process can continue or reinitiate on that particular entity of the enterprise network 140. In various embodiments, if the resource availability module 224 determines that the resource utilization of a particular entity is greater than an entity unavailable threshold, the resource availability module 224 may send a request to the discovery suspension module 226 that the application discovery process for the particular entity needs to be suspended. In various embodiments, the entity available threshold has a value that is the same as the entity unavailable threshold.

In various embodiments, entities with different tier mappings may have different entity utilization thresholds. For example, an entity with a tier 0 mapping may have a lower entity utilization threshold than an entity with a tier 1 mapping and so on. Different types of entities may have different entity utilization thresholds, for example, storage devices 144 may have a lower entity utilization threshold than hosts 142. In some embodiments, all entities of network 140 may have the same entity utilization threshold.

The resource availability module 224 may determine an aggregate utilization to all the entities belonging to a particular application, such as an email service. In some embodiments, the aggregate utilization of the email service can be determined by taking a weighted average of the entity utilization of some or all of the entities of the email service. When the aggregate utilization is less than an application available threshold, the resource availability module 224 may send a request to the scheduling module 222 to commence the application discovery process on the entities associated with the email service.

In some embodiments, the resource availability module 224 may determine that the aggregate utilization of an application is less than the application available threshold during some interval of time every day, or every week. With this information, the resource availability module 224 may send a request to the scheduling module 222 to schedule the application discovery process for entities associated with the email service. When the aggregate utilization is greater than an application unavailable threshold, the resource availability module 224 may send a request to the discovery suspension module 226 to suspend the application discovery process in general or for only a part of the enterprise network (e.g., directing the application discovery process away from portions of the network that are in use or above the utilization threshold(s)). In various embodiments, the aggregate utilization can be determine in other ways. In some embodiments, the application available threshold may have a value that is the same as the application unavailable threshold.

The discovery suspension module 226 may suspend the application discovery process in response to a request to suspend the application discovery process. In some embodiments, the request to commence or suspend the application discovery process may be received from the input module 204, the scheduling module 222, the resource availability module 224 or the discovery module 206. The trigger condition may include receiving, by the input module 204, an ad hoc request to suspend or reinitiate the application discovery process, determining, by the scheduling module 222 that the current time equals the scheduling application discovery commencement or suspension time. Other trigger conditions include the resource availability module 224 determining that the resource utilization of a particular entity, or entities is greater than the entity utilization threshold. When one of the above trigger conditions is satisfied, the scheduling module may send a request to the discovery module 206 to suspend the application discovery process. In some embodiments, the trigger conditions which suspend the application discovery process, or suspension trigger conditions may be different from the trigger conditions which continue or re-initiate the application discovery process.

The entities module 228 may identify any number of entities of the network and their associated properties or attributes. Entities of the enterprise network 140 may be grouped into one of the following entity categories: applications, conversations, compute, network, and storage.

The tables 1 through 5 list some entities of each category. The entities module 228 may create an entity entry for each entity of the enterprise network 140. Each of the plurality of entity entries may include attributes associated with the entity, as well as any alarms associated with the entity.

TABLE 1

| Entity Types - Applications | |
| --- | --- |
| Category | Type |
| Application | Tier |
| | Application |
| | vApp |

TABLE 2

Entity Types - Conversations

| Category | Type |
| --- | --- |
| Conversations | FC Conversation |
| | NFS Conversation |
| | SMB Conversation |
| | Network Conversation |

TABLE 3

Entity Types - Computer

| Category | Type |
| --- | --- |
| Compute | Host |
| | HBA Card |
| | HBA Port |
| | ESX Cluster |
| | ESX Host |
| | Hyper-V Cluster |
| | Hyper-V Host |
| | IP Address |

TABLE 4

Entity Types - Network

| Category | Type |
| --- | --- |
| Network | Physical Fabric |
| | SAN Switch |
| | LAN |
| | Logical Fabric |
| | Logical Switch |
| | Port Channel |
| | VLAN |

TABLE 5

Entity Types - Storage

| Category | Type |
| --- | --- |
| Storage | Storage Array |
| | Storage Controller |
| | Storage I/O Module |
| | NetApp Cluster |
| | NetApp Storage Node |
| | NetApp SVM |
| | ESX Datastore |
| | Hyper-V VHD |
| | Cache vSAN Disk |
| | Capacity vSAN Disk |

The infrastructure module 230 may determine the infrastructure of the enterprise network 140. The infrastructure module 230 may aid users of the application discovery system 110 with a visual representation of the infrastructure in the context of key applications of the enterprise.

In some embodiments, the determination of the infrastructure of the enterprise network 140 may be optional. In addition to discovering the entities of the infrastructure, the attributes of the entities of the enterprise network 140 within the infrastructure may also be discovered. In some embodiments, the attributes of the entities of the enterprise network 140 may be determined or discovered using application heuristics for discovering applications.

The data gathered by the infrastructure module 230 may be used to create an infrastructure topology view, display applications running on a specific host, and how the specific host is connected to other entities of the network.

Figure 6:
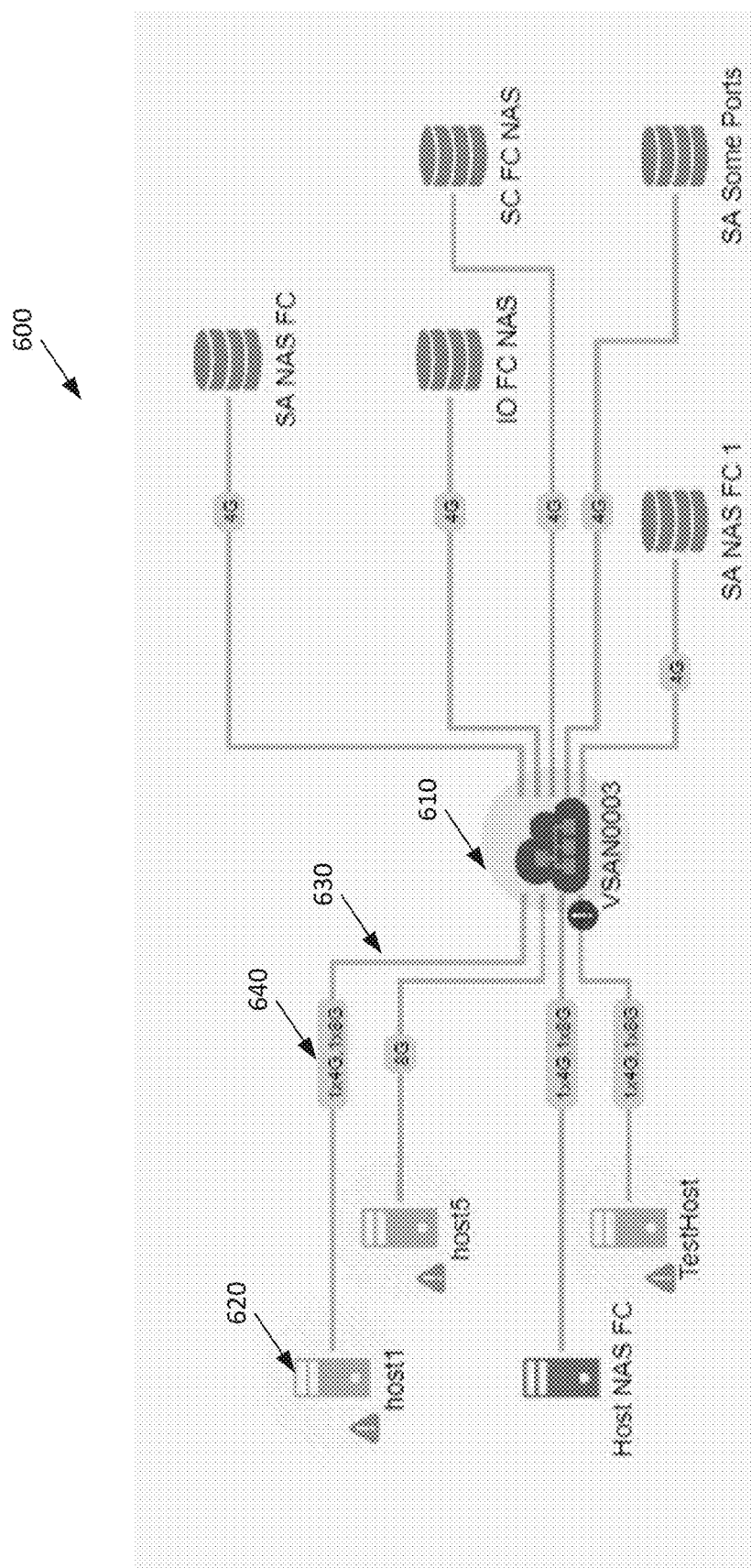
FIG. 6 depicts an example infrastructure topology of an example enterprise system according to some embodiments.

FIG. 6 depicts an example infrastructure topology 600 according to some embodiments. Infrastructure topology 600 illustrate applications running on virtual storage area network (vSAN) 610. In the infrastructure topology 600, the vSAN 610 is given a label "VSAN0003" and it is connected to host 620 via connection 630. Label 640 indicates the speed of the connection 630. The infrastructure topology view may be outputted to the IT administrator or authorized device by the reporting module 234

The attributes module 232 may receive the attributes or properties of entities of the enterprise network 140. Attributes associated with entities or applications may be received from the input module 204. The input module 204 may receive data regarding attributes of one or more entities of applications and/or entities of the enterprise network 140. Attributes may be associated with software platforms, for example, an application discovered by ServiceNow as a tier 1 criticality may be remapped to tier 0 in the application discovery system 110. This may be done to prioritize applications discovered by one software platform over another. Some entity attributes may be dependent on the type of entity, for example, fiber channels may have an attribute describing the speed of the channel. An entity may be associated with two or more applications, with each application having its own tier mapping, such an entity may be assigned the highest tier mapping.

The reporting module 234 may provide a report or identification of any number of discovered application entries and/or a plurality of entity entries. In some embodiments, the reporting module provides the output in real time.

The plurality of discovered application entries may include discovered applications and application conflicts. An application conflict may arise when two discovered application entries are presented in the reporting module 234 with a degree of similarity greater than a similarity threshold. The degree of similar may be based on the two or more discovered application entries including the number and type of entities associated with the application entries and the comparison of the fabric connections between the entities.

For example, the network traffic analyzer integration module 212 may receive IP network traffic data from NetFlow and the network traffic analysis module 214 implies, or identifies a first VDI application, with a number of entities (e.g., ten) associated with the application, with the number of entities communicating with each other in a particular configurations. The network traffic analysis module 214 may create a discovered application entry and store the entry into the discovery state datastore 236. The discovered application entry may include attributes of the discovered application such as a suggested name for the discovered application, and entities, as well as attributes associated with the entities which make up the discovered application. To further the example, ServiceNow identifies a second VDI application with eight entities. In this example, these eight entities are the same as the first VDI application, with the eight entities communicating with each other in a configuration that is exactly the same as the eight entities that are identical to the first VDI application. A discovered application entry may be created for the first and second VDI application and both entries may be stored in the discovery state datastore 236, creating an application conflict.

In some embodiments, two discovered application entries may be determined to represent the same application if there is a match to the number and type of entities associated with the application, as well as the fabric connections between the entities. In various embodiments, two discovered application entries may be determined to represent the same application if the number of matching entities and matching fabric connections is greater than an entity matching threshold. In one embodiment, when two discovered application entries are determined to represent the same application, the discovery module 206 may increment a duplicated application counter. The entity matching threshold may be different depending on the application tier mapping, for example, tier 0 applications may have a higher entity matching threshold than for a tier 1 application, and so on.

In some embodiments, the application conflict may be reported by the reporting module 234 to the IT administrator to be resolved. In various embodiments, the discovery module 206 may resolve the conflict without assistance from the IT administrator. The discovery module 206 may resolve the conflict by using the tier mapping of software platforms. For example, the IT administrator may choose to prioritize applications discovered by ServiceNow over the analysis of NetFlow, such that if there is an application conflict between applications discovered by ServiceNow and the analysis of NetFlow, the conflict will be automatically resolved by the application discovery system 110 by prioritizing the application discovered by ServiceNow as the one most likely to be the correct one.

Figure 7:
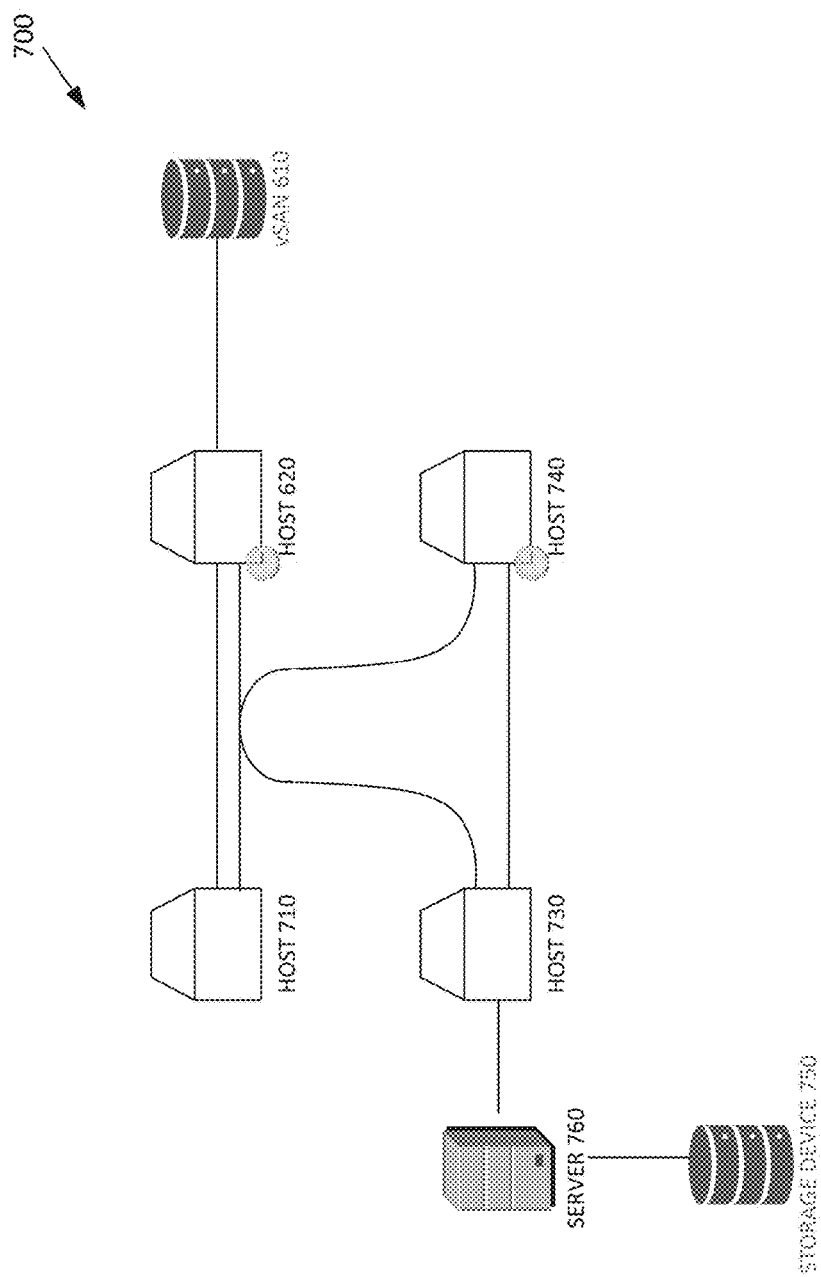
FIG. 7 depicts an example application topology of an example enterprise system according to some embodiments.

The reporting module 234 may provide the discovered application entries in the form of a chart, with each discovered application entry, their associated entities and attributes of the application and entities displayed in text form. In some embodiments, the reporting module 234 may provide the discovered application entry in the form of an application topology, showing a representative of the entities associated with a particular application and how the entities are coupled to each other. FIG. 7 depicts an example application topology 700 according to some embodiments. Application topology 700 depicts the entities, such as host 620, 710, 730, and 740, storage devices vSAN 610 and 750, and server 760. These entities comprise an example application such as a VDI application.

In some embodiments, the reporting module 234 may provide the entity entry in the form of an infrastructure topology, showing a representation of a particular entity associated with the entity entry. The infrastructure topology may also show a representation of applications running on the particular entity and other entities of the enterprise network 140 are connected to that particular entity. An example of an infrastructure topology may be seen in FIG. 6.

A user interacting with the infrastructure topology may choose an entity and view an application topology of the chosen entity. For example, the user may interact with entity vSAN 610 of infrastructure topology 600 of FIG. 6 and view the application topology of vSAN 610, as seen in example application topology 700 of FIG. 7.

In one embodiment, users interacting with the discovered application entry in discovered application chart or entity chart by filtering the results of the chart. For example, the discovered application chart may be filtered to only show applications in which a storage array is involved in the application, the results may be further filtered by specifying storage arrays of a particular size.

In various embodiments, the reporting module 234 may provide data in the context of an entity hierarchy of an application. For example, the reporting module 234 may provide reports containing information regarding usage of one or more entities or applications over a period of time. This information may be useful for further analysis of the enterprise network 140 to determine if seasonal trends exist in the network.

The discovery state datastore 236 may be any structure and/or structures suitable for storing data entries or records (e.g., an active database, a relational database, a self-referential database, a table, a matrix, an array, a flat file, a documented-oriented storage system, a non-relational NoSQL system, an FTS-management system such as Lucene/Solar, and the like). The discovery state datastore may store the discovered application entry from the IT management integration module 208, the application performance integration module 210, the network traffic analysis module 214 or the probe data analysis module 218. The discovered application entry may include entities associated with the application, as well as attributes associated with the application and their associated entities. Attributes of the application may include a label for the discovered application, tier of the application and a time stamp of the creation of the application. The label of the discovered application may be auto-generated by the software platform or the label may be received by the input module 204. Attributes of the entities associated with the application may include a label of the entity, tier mapping of the entity and type of entity. Some entity attributes may be dependent on the type of entity, for example, fiber channels may have an attribute describing the speed of the channel.

A module may be hardware or software. In some embodiments, the module may configure one or more processors to perform functions associated with the module. Although different modules are discussed herein, it will be appreciated that the application discovery system 110 may include any number of modules performing any or all functionality discussed herein.

Figure 3:
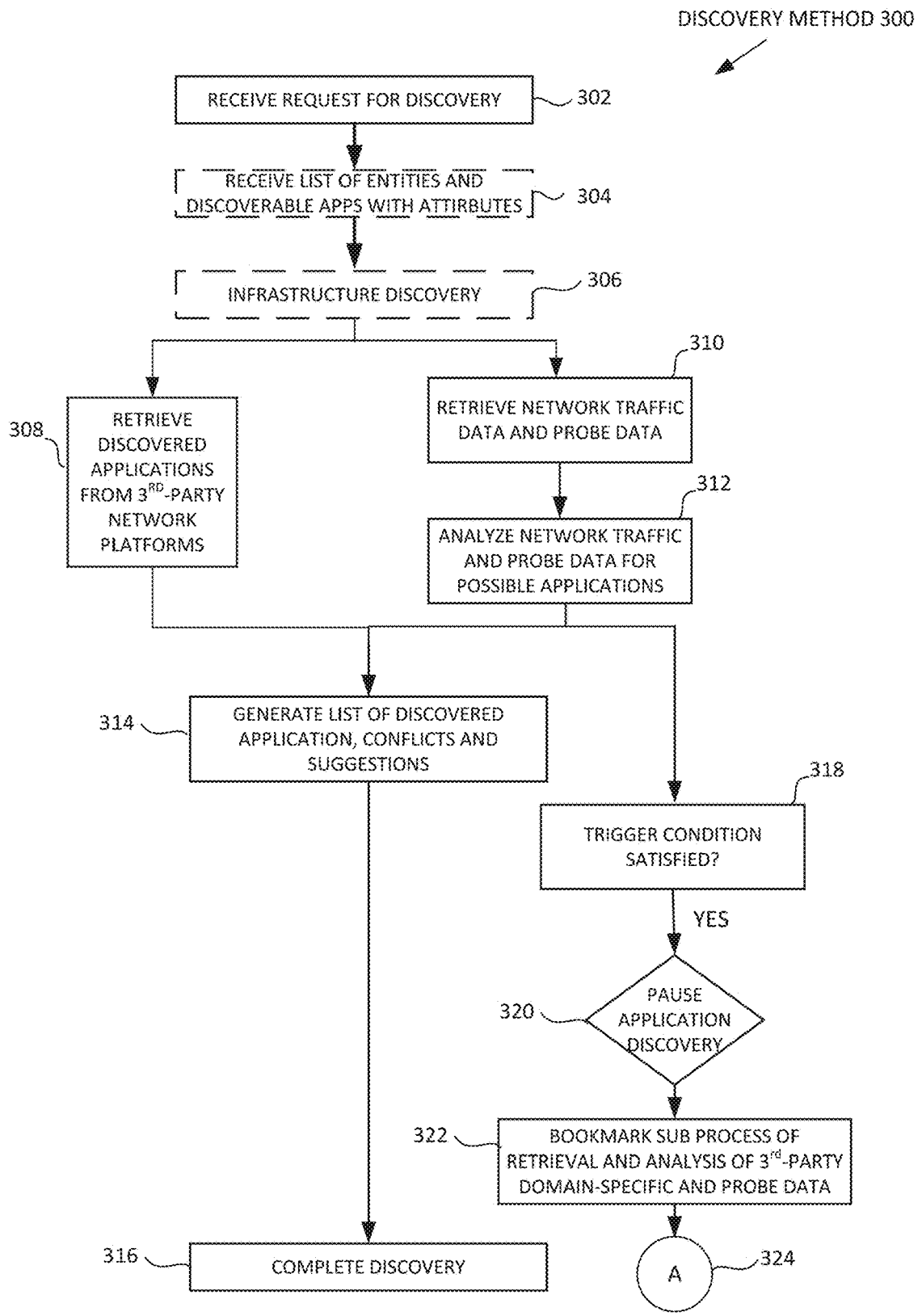
FIG. 3 depicts a flowchart of an application discovery process of an enterprise system according to some embodiments.

FIG. 3 depicts a flowchart 300 of an initial application discovery process of an enterprise system according to some embodiments. In step 302, the discovery module 206 may function to determine if one a plurality of trigger conditions is satisfied. The discovery module 206 may receive a notification or indication from the discovery suspension module 226 that one of a plurality of trigger conditions has been satisfied. The trigger conditions may include a request to commence the application discovery process, a current time equaling a start time of a scheduled application discovery process, a signal, or the resource utilization of one or more entities if less than an entity utilization threshold.

In some embodiments, the communication module 202 may facilitate a request from the IT administrator, or another user of the enterprise network 140 to initiate the application discovery process. The request may be sent to the discovery suspension module 226 to start the application discovery process and proceed to step 304.

The communication module 202 may be configured to facilitate the signal/request to schedule an application discovery process to start at a specified day of the week and/or time of the day and/or duration. The communication module 202 may send the schedule received to the scheduling module 222. When the scheduling module 222 determines that the current time equals the scheduled application discovery start time, the scheduling module 222 may send a request to the discovery suspension module 226 to start the application discovery process and proceed to step 304.

In various embodiments, the communication module 202 may facilitate a request from the resource availability module 224 to initiate the application discovery process. In some embodiments, when the resource availability module 224 determines that the resource utilization of a particular entity is less than the entity utilization threshold, the resource availability module 224 may send a request to the discovery suspension module 226 that the application discovery process can commence on that particular entity of the enterprise network 140. The request from the resource availability module 224 is sent to the discovery suspension module 226 to start the application discovery process and proceed to step 304.

In optional step 304, the input module 204 may receive from the IT administrator a list of applications running on the enterprise network 140 and entities of the enterprise network 140 associated with each of the plurality of applications. In some embodiments, the input module 204 is configured to receive attributes of any number of the applications running on the enterprise network 140 and attributes of each of the entities associated with each of the plurality of applications.

In various embodiments, the input module 204 may send one or more identifications of one or more applications in the list received from the IT administrator to the discovery state datastore 236 to create and store any number of discovered application entries. Furthermore, the input module may send one or more identifications of any number of entities of the enterprise network 140 received from the IT administrator to the entities module 228 to create and store the entity entry.

In optional step 306, the infrastructure module 230 is configured to receive a request from the discovery module 206 to determine the infrastructure of the enterprise network 140. In some embodiments, the infrastructure module 230 discovers attributes of any number of entities of the enterprise network 140 and sends the entity attributes to the entities module 228 to create and store entity entry. The infrastructure module 230 may aid users of the application discovery system 110 with a visual representation of the infrastructure in the context of key applications of the enterprise.

In step 308, the IT management integration module 208 may receive a request from the discovery module 206 to accept data regarding applications from the input module 204. The data received regarding application may include attributes of the application, such as the name, the number of entities making up the application, the tier mapping of the application. The data received regarding application may include attributes of each of the entities associated with the application. Attributes of the entities may include entity category, entity type, speed of the channel, and alarms. Some entity attributes may be dependent on the type of entity, for example, fiber channels may have an attribute describing the speed of the channel.

The input module 204 may receive data from IT management software platform subscribed to by the enterprise network 140, such as ServiceNow. In some embodiments, the IT management integration module 208 may receive data regarding discovered applications directly from ServiceNow. In various embodiments, the IT management integration module 208 may receive data regarding discovered applications from other IT management software platforms.

In some embodiments, the IT management integration module 208 receives data regarding applications directly from ServiceNow. The IT management integration module 208 may receive information regarding applications or business services discovered by local and cloud instances of ServiceNow. The application performance integration module 210 may send a request to the discovery state datastore 236 to create discovered application entr(ies) for applications discovered by ServiceNow. In various embodiments, the application performance integration module 210 may send a request to the entities module 228 to create or update entity entries with data received from ServiceNow or other IT management software platforms.

In some embodiments, if the IT management integration module 208 discovers that a particular application has not changed in the last number of iterations of the application discovery process. In such a case, the IT management integration module 208 may choose to limit the application discovery process to avoid re-identification and/or re-discovery of a subset of applications periodically. In various embodiments, the number of iterations which triggers the periodic discovery of an application may change according to attributes of the particular application, such as tier or criticality of the particular application.

In some embodiments, application performance integration module 210 is configured to receive from the discovery module 206 data regarding applications from the input module 204. The data received regarding application may include attributes of the application, such as the name, the number of entities making up the application, the tier mapping of the application. The data received regarding application may include attributes of each of the entities associated with the application. Attributes of the entities may include entity category, entity type, speed of the channel, and alarms. Some entity attributes may be dependent on the type of entity, for example, fiber channels may have an attribute describing the speed of the channel.

The input module 204 may receive data from application performance software platforms subscribed to by the enterprise network 140, such as AppDynamics. In some embodiments, the application performance integration module 210 may receive data regarding discovered applications directly from AppDynamics. The application performance integration module 210 may be configured to receive from the input module 204 applications or business services discovered by other application performance software platforms.

In some embodiments, the application performance integration module 210 receives data regarding applications directly from AppDynamics. The application performance integration module 210 may receive applications discovered by local and cloud instances of AppDynamics. The application performance integration module 210 may send a request to the discovery state datastore 236 to create a discovered application entry for applications discovered by AppDynamics. In various embodiments, the application performance integration module 210 may send a request to the entities module 228 to create or update entity entries with data received from AppDynamics or other application performance software platforms.

In some embodiments, if the application performance integration module 210 discovers that a particular application has not changed in the last number of iterations of the application discovery process. In such a case, the application performance integration module 210 may choose to identify or discover the application periodically. In various embodiments, the number of iterations which triggers the periodic discovery of an application may change according to attributes of the particular application, such as tier or criticality of the particular application.

In step 310, the network traffic analyzer integration module 212 may receive a request from the discovery module 206 to accept flow records between two IP addresses from the input module 204.

The input module 204 may receive flow records from switches enable with a network protocol which provides the ability to collect IP network traffic using software such as NetFlow. These flow records may be analyzed by the network traffic analysis module 214 to determine possible network endpoints and possible applications on network 140. In some embodiments, the network traffic analyzer integration module 212 may receive flow records from NetFlow directly.

In some embodiments, the network traffic analyzer integration module 212 is configured to retrieve flow records from NetFlow during scheduled retrieval periods. In various embodiments, the network traffic analyzer integration module 212 retrieves flow records when the resource availability module 224 determines that the utilization of switches enabled with the NetFlow software is below the entity utilization threshold.

The probe input module 216 may receive probe data from the probes 120. In some embodiments, the probe input module 216 is configured to receive flow data to and from storage devices 144. Probe data may include IP address, probe type, network address, speed of the channel and status of the probe, number of CPUs, operating system (OS) version, and applications running on the host. Data gathered by the probe input module 216 may be sent to the probe data analysis module 218 for analysis.

In step 312, the network traffic analysis module 214 may receive the network traffic data from the network traffic analyzer integration module 212, and the probe data analysis module 218 may receive probe data from the probe input module 216.

In some embodiments, the network traffic analysis module 214 suggests, based on heuristic implication, applications that could exist. The result of the implications may be a possible discovered application. For example, the network traffic analysis module 214 may observe that a particular IP address is the flow source/destination to/from thousands of seemingly random IP addresses, and determine that the particular IP address is belongs to an edge device.

In some embodiments, the network traffic analysis module 214

The probe analysis module 218, like the network traffic analysis module 214, may determine based on heuristic implications that applications that could exist on the enterprise network 140. For example, through SSH or WMI, the probe analysis module 218 may determine that one of the host 142 of enterprise network 140 which is part of the SAP is running an out-of-date software which has subsequent been replaced with a different software, but the out-of-date software has not been removed from one of the host 142. The attributes of the SAP application as well as attributes associated with the out-of-date software running on one of the host 142 may be sent to the discovery state datastore 236.

In various embodiments, the probe analysis module 218 may perform a heuristic analysis of the attributes of any number of entities of the enterprise network 140. Attributes may include as name of the entity, when an entity was introduced to, or became a part of the enterprise network 140. Attributes may be used to determine if any number of entities is a part of an application. For example, entities with names containing a prefix or suffix that are the same may be a part of the same application.

The probe analysis module 218 may analyze network data, the network data including data from the probes 120. The data from the probes 120 may include the prefix or suffix of entities of the enterprise network and compare the prefix or suffix of the entities of the enterprise network with a name matching threshold. For example, if more than the first four letters of the prefix of an entity name match, the probe analysis module may send a request to the discovery state datastore 236 to create a discovered application entry for a potential application.

In some embodiments, a time when entities of the enterprise network are introduced into the enterprise network may be analyzed and compared with an entities introduction threshold may be used to determine potential applications. For example, entities introduced to the enterprise network 140 within the entities introduction threshold of 5 minutes may be part of the same application, in either case, the probe analysis module 218 may send a request to the discovery state datastore 236 to create a discovered application entry for each of the potential applications. The entities introduction threshold may be set by the IT administrator or may be set by the discovery module 206. In various embodiments, the probe analysis module 218 may suggest that two particular entities of the network may comprise an application if the two particular entities are in constant contact throughout the day, with amount of IP traffic passing back and forth between the two particular entities is more than any other pair of entities of the network.

In step 314, the reporting module 234 outputs a list of discovered application entries and/or a plurality of entity entries. The reporting module 234 may output any number of the discovered application entries in the form of a chart, with each discovered application entry as well as application attributes displayed in text form. In some embodiments, entities associated with each discovered application as well as attributes associated with each entity may be displayed in text form.

Attributes of the discovered application entry output by the reporting module 234 may include the software platform responsible for the application associated with the discovered application entry. Other attributes include tier mapping of applications discovered by different network, name of application. Attributes of the entities may include entity category, entity type, speed of the channel, and/or alarms. Some entity attributes may be dependent on the type of entity, for example, fiber channels may have an attribute describing the speed of the channel.

In some embodiments, an application conflict may be provided by the reporting module 234 to the IT administrator to be resolved. Consider an example, if AppDynamics identifies a first SAP application with eight entities including three cloud-based storage devices, and four locally-based storage devices. The network traffic analysis module 214 implies a second SAP application with the same eight entities, including the three cloud-based storage devices and the four locally-based storage devices, as the first SAP application plus an additional cloud-based storage device which is not shown in the first SAP application. The discovered application entry may be created for each of the SAP application and the application conflict may be outputted by the reporting module 234. The application conflict may be resolved by the IT administrator.

In various embodiments, the discovery module 206 may resolve the conflict without assistance from the IT administrator. In various embodiments, the discovery module 206 may resolve the conflict by using the tier mapping of software platforms. For example, the IT administrator may choose to prioritize applications discovered by ServiceNow over applications discovered by AppDynamics, such that if there is an application conflict between applications discovered by ServiceNow and AppDynamics, the conflict will be automatically resolved by the application discovery system 110 by choosing the application discovered by ServiceNow as the correct one.

In some embodiments, the reporting module 234 may provide the discovered application entry in the form of an application topology, showing a representative of the entities associated with a particular application and how the entities are coupled to each other. An example of an application topology may be seen in FIG. 7.

Once entities of the enterprise network 140 have been identified, data from the network software platforms and network probes may have been received and analyzed by the application discovery system 110, and the application discovery process may proceed to step 316. In step 316, an iteration of the application discovery process is complete. In some embodiments, the iteration application discovery process may be deemed as complete after the application discovery system 110 receives data from software platforms and network probe for a predetermined period of time. In some embodiments, the predetermined period of time is seven days. In various embodiments, the predetermined period of time is 24 hours. In one embodiment, the predetermined period of time is set by the IT administrator.

In some embodiments, the iteration application discovery process may be deemed as complete if the discovery module 206 determines that a duplicated applications counter is greater than a duplicated application threshold. The duplicated applications counter may increment when the discovery module 206 receives a notification of a duplicate discovered application entry from the discovery state datastore 236.

In step 318, the discovery module 206 may function to determine if one of any number of trigger conditions is satisfied. In some embodiments, the discovery module 206 may receive a notification from the discovery suspension module 226 that a trigger condition has been satisfied. The discovery suspension module 226 may receive notification that a trigger condition has been satisfied from the input module 204, the scheduling module 222 or the resource availability module 224. Once the discovery module 206 receives the notification, the discovery module 206 may send a request to the discovery suspension module 226 to suspend the application discovery process.

The trigger condition may include receiving, by the input module, an ad hoc request to suspend the application discovery process, determining, by the scheduling module 222 that the current time equals the scheduling application discovery suspension time. Other trigger conditions include the resource availability module 224 determining that the resource utilization of a particular entity, or entities is greater than the entity utilization threshold. When one of the above trigger conditions is satisfied, the scheduling module may send a request to the discovery module 206 to suspend the application discovery process.

In some embodiments, the input module 204, the scheduling module 222 or the availability module 224 may send the request to suspend the application discovery process to the discovery module 206 directly.

In step 320 the application discovery method 300 is suspended in response to receiving a request to suspend the application discovery process. The discovery suspension module 226 may suspend the application discovery process in response to one or more trigger conditions being satisfied.

In step 322, in response to the suspension of the application discovery process, the discovery state datastore 236 may bookmark the last application discovered by the software platforms, such as ServiceNow and AppDynamics. The bookmark may indicate a point in the application discovery process where the process is suspended. For example, the bookmark may indicate the last application or entity scanned, last information received, information regarding a position relative to a topology of the enterprise network, and/or a point within the application discovery process.

Furthermore, the discovery state datastore 236 may bookmark the last data retrieved and analyzed from NetFlow and the probes 120. In some embodiments, each integration module of the application discovery system 110 is configured to bookmark the last data received just before the application discovery process is suspended. For example, the IT management integration module 208 may bookmark the last application discovered by ServiceNow, the probe input module 216 may bookmark the last probe data from the probes 120. In various embodiments, each analysis module of the application discovery system 110 is configured to bookmark the last data analyzed just before the application discovery process is suspended.

Figure 4:
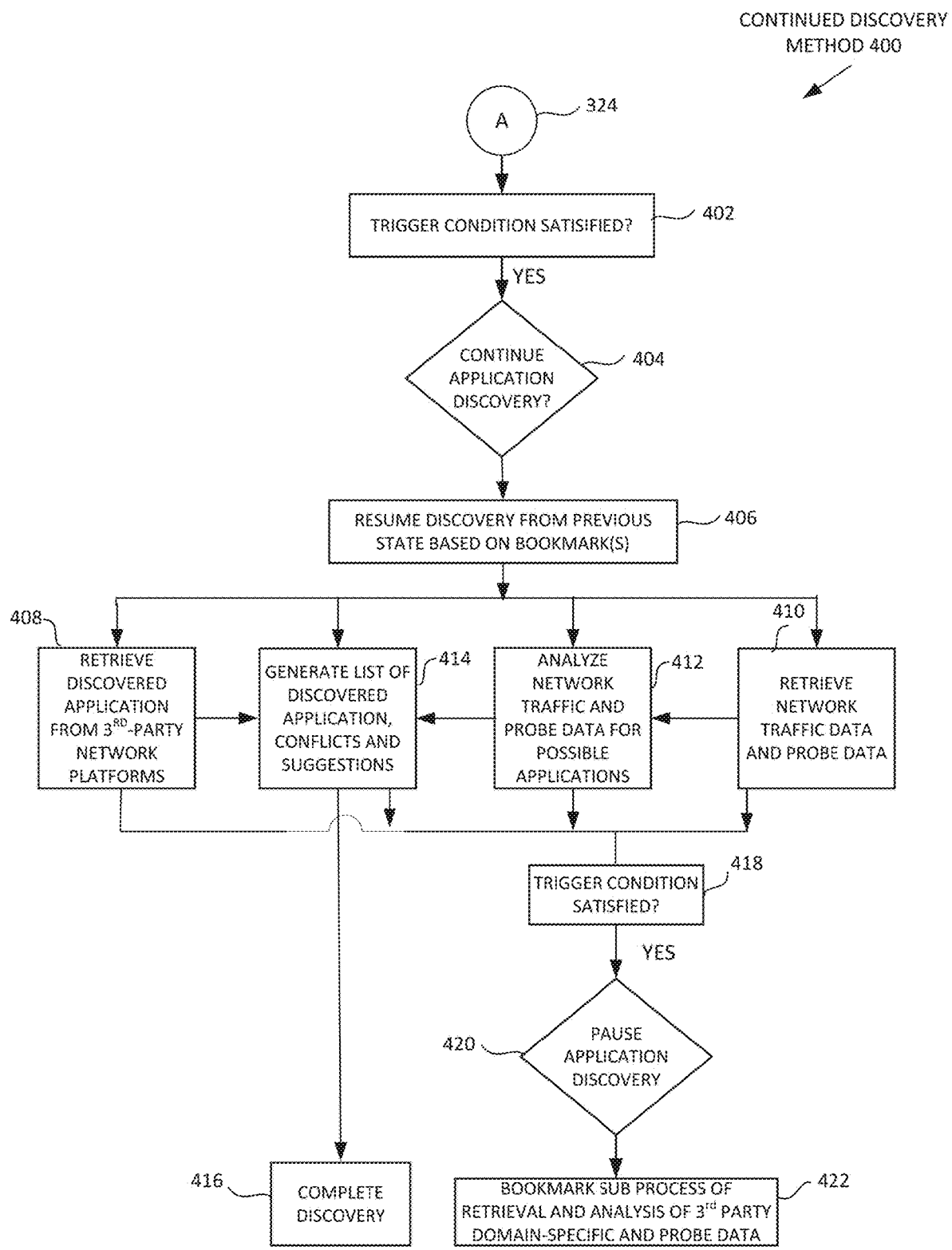
FIG. 4 depicts a flow chart of a scheduled application discovery process of an enterprise system according to some embodiments.

Step 324 represents the step linking FIG. 3 with FIG. 4.

FIG. 4 depicts a flow chart 400 of a scheduled application discovery process of an enterprise system according to some embodiments.

In step 324, the application discovery process is suspended and continues to be suspended until the discovery suspension module 226 sends a request to the discovery module 206 to continue the application discovery process.

In step 402, the discovery module 206 may function to determine if one of a plurality of trigger conditions is satisfied. The discovery module 206 may receive a notification from the discovery suspension module 226 that a trigger condition has been satisfied. The discovery suspension module 226 may receive notification that a trigger condition has been satisfied from the input module 204, the scheduling module 222 or the availability module 224. Once the discovery module 206 receives the notification, the discovery module 206 may send a request to the discovery suspension module 226 to continue the application discovery process.

In some embodiments, the trigger condition may include one of: receiving, by the input module 204, an ad hoc request to continue the application discovery process, determining, by the scheduling module 222 that the current time equals the scheduling application discovery continuation time. Other trigger conditions include the resource availability module 224 determining that the resource utilization of a particular entity, or entities is less than the entity utilization threshold. When one of the above trigger conditions is satisfied, the scheduling module may send a request to the discovery module 206 to continue the application discovery process (e.g., from the previous suspension state). In some embodiments, an entity utilization threshold which triggers the suspension of the application discovery process is different from an entity utilization threshold which triggers the continuation of the application discovery process.

In some embodiments, the input module 204, the scheduling module 222 or the availability module 224 may send the request to continue the application discovery process to the discovery module 206 directly.

In step 404, the application discovery method 300 continues in response to the discovery module 206 receiving the request from the discovery suspension module 226 to continue the application discovery process. The discovery suspension module 226 may continue the application discovery process in response to one or more trigger conditions being satisfied.

In response to the continuation of the application discovery process, the application discovery process may proceed to step 406. In step 406, the discovery module 206 may send a request to the integration modules of the application discovery system 110 to continue receiving and analyzing data from the last bookmarked from NetFlow and the probes 120.

In step 406, the discovery module 206 may send a request to the software platforms to resume the application discovery process from the last bookmarked discovered application by ServiceNow and AppDynamics. In some embodiments, the platforms integration modules do not take into account the last bookmarked discovered application when the application discovery process is resumed.

For example, the discovery module 206 may send a request to the probe input module 216 and the probe data analysis module 218 to respectively resume receiving and analyzing probe data from the last bookmarked probe data. In some embodiments, the probe input module 216 and the probe data analysis module 218 do not take into account the last bookmarked received probe data and analyzed probe data when the application discovery process is resumed.

Steps 408 through 422 are similar to steps 308 through 322 of FIG. 3. For example, in step 408, the IT management integration module 208 may receive a request from the discovery module 206 to accept data regarding applications from the input module 204. The data received regarding application may include attributes of the application, such as the name, the number of entities making up the application, and the tier mapping of the application. The data received regarding application may include attributes of each of the entities associated with the application. Attributes of the entities may include entity category, entity type, speed of the channel, and alarms. Some entity attributes may be dependent on the type of entity, for example, fiber channels may have an attribute describing the speed of the channel.

In step 410, the network traffic analyzer integration module 212 may receive a request from the discovery module 206 to accept flow records between two IP addresses from the input module 204.

In step 412, the network traffic analysis module 214 may receive the network traffic data from the network traffic analyzer integration module 212, and the probe data analysis module 218 may receive probe data from the probe input module 216.

In step 414, the reporting module 234 is configured to output a plurality of discovered application entries and/or a plurality of entity entries. The reporting module 234 may output the plurality of discovered application entries in the form of a chart, with each discovered application entry as well as application attributes displayed in text form. In some embodiments, entities associated with each discovered application as well as attributes associated with each entity may be displayed in text form.

Steps 408-414 may be performed in parallel, serially, asynchronously, or in any order.

In step 416, the iteration of the application discovery process is complete. In some embodiments, the iteration of the application discovery process may be deemed as complete after the application discovery system 110 receives data from software platforms and network probe for a predetermined period of time. In some embodiments, the predetermined period of time is seven days. In various embodiments, the predetermined period of time is 24 hours. In one embodiment, the predetermined period of time is set by the IT administrator. In some embodiments, the iteration of the application discovery process may be deemed as complete if the discovery module 206 determines that a duplicated applications counter is greater than a duplicated application threshold. The duplicated applications counter may increment when the discovery module 206 receives a notification of a duplicate discovered application entry from the discovery state datastore 236.

In step 418, the discovery module 206 may function to determine if one or more trigger conditions are satisfied. In some embodiments, the discovery module 206 may receive a notification from the discovery suspension module 226 that a trigger condition has been satisfied. The discovery suspension module 226 may receive notification that a trigger condition has been satisfied from the input module 204, the scheduling module 222 or the availability module 224. Once the discovery module 206 receives the notification, the discovery module 206 may send a request to the discovery suspension module 226 to suspend the application discovery process.

In step 420 the application discovery method 300 is suspended in response to receiving a request to suspend the application discovery process. The discovery suspension module 226 may suspend the application discovery process in response to one or more trigger conditions being satisfied.

In step 422, in response to the suspension of the application discovery process, the discovery state datastore 236 may bookmark the last application discovered by the software platforms, such as ServiceNow and AppDynamics. Furthermore, the discovery state datastore 236 may bookmark the last data retrieved and analyzed from NetFlow and the probes 120. In some embodiments, each integration module of the application discovery system 110 is configured to bookmark the last data received just before the application discovery process is suspended. For example, the IT management integration module 208 may bookmark the last application discovered by ServiceNow, the probe input module 216 may bookmark the last probe data from the probes 120. In various embodiments, each analysis module of the application discovery system 110 is configured to bookmark the last data analyzed just before the application discovery process is suspended.

Figure 5:
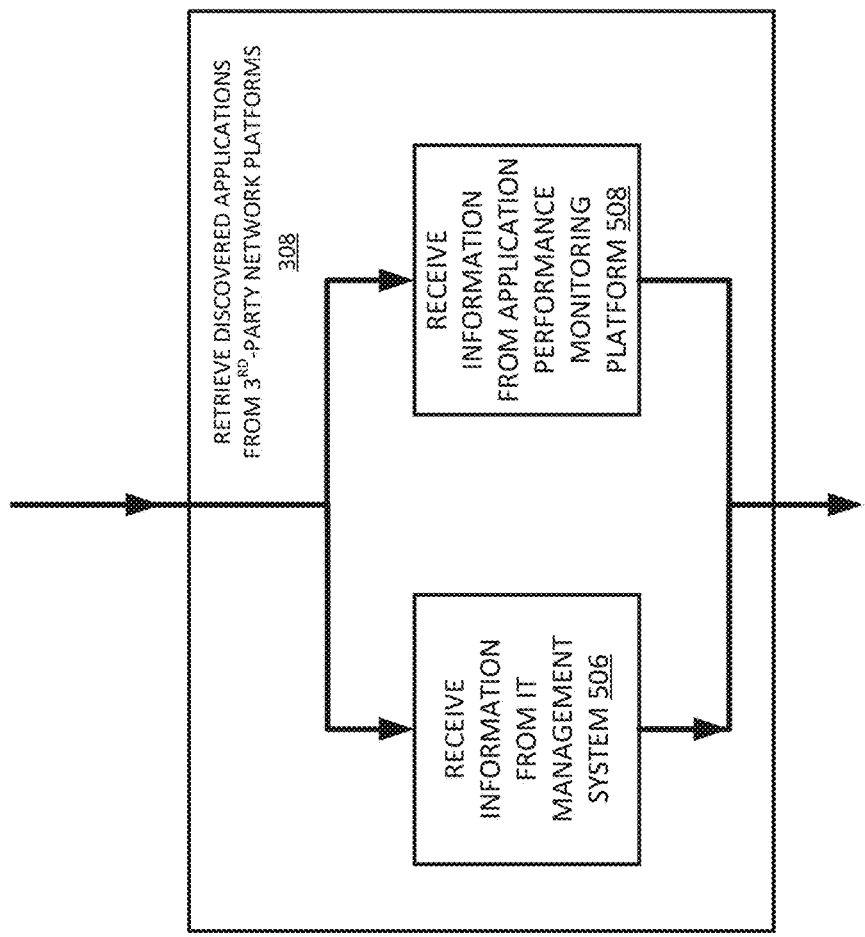
FIG. 5 depicts a details of one step of the initial application discovery flowchart according to some embodiments.

FIG. 5 depicts a details of step 308 of the application discovery process 300 of FIG. 3 according to some embodiments. In step 506, the IT management integration module 208 may receive data regarding applications discovered by ServiceNow.

In step 508, the application performance integration module 210 may receive data regarding applications discovered by AppDynamics.

The IT management integration module 208 and the application performance integration module 210 may receive data regarding applications discovered by ServiceNow and AppDynamics respectively in parallel or at substantially the same time. In some embodiments, the IT management integration module 208 may receive data regarding application discovered by ServiceNow before the application performance integration module 210 receives data regarding applications discovered by AppDynamics. In various embodiments, the application performance integration module 210 receives data regarding applications discovered by AppDynamics before the IT management integration module 208 may receive data regarding application discovered by ServiceNow.

In some embodiments, if the enterprise network is not subscribed to any IT management software platforms, step 506 may be skipped. In various embodiments, if the enterprise network is not subscribed to any application performance monitoring software platforms, step 508 may be skipped.

Figure 10:
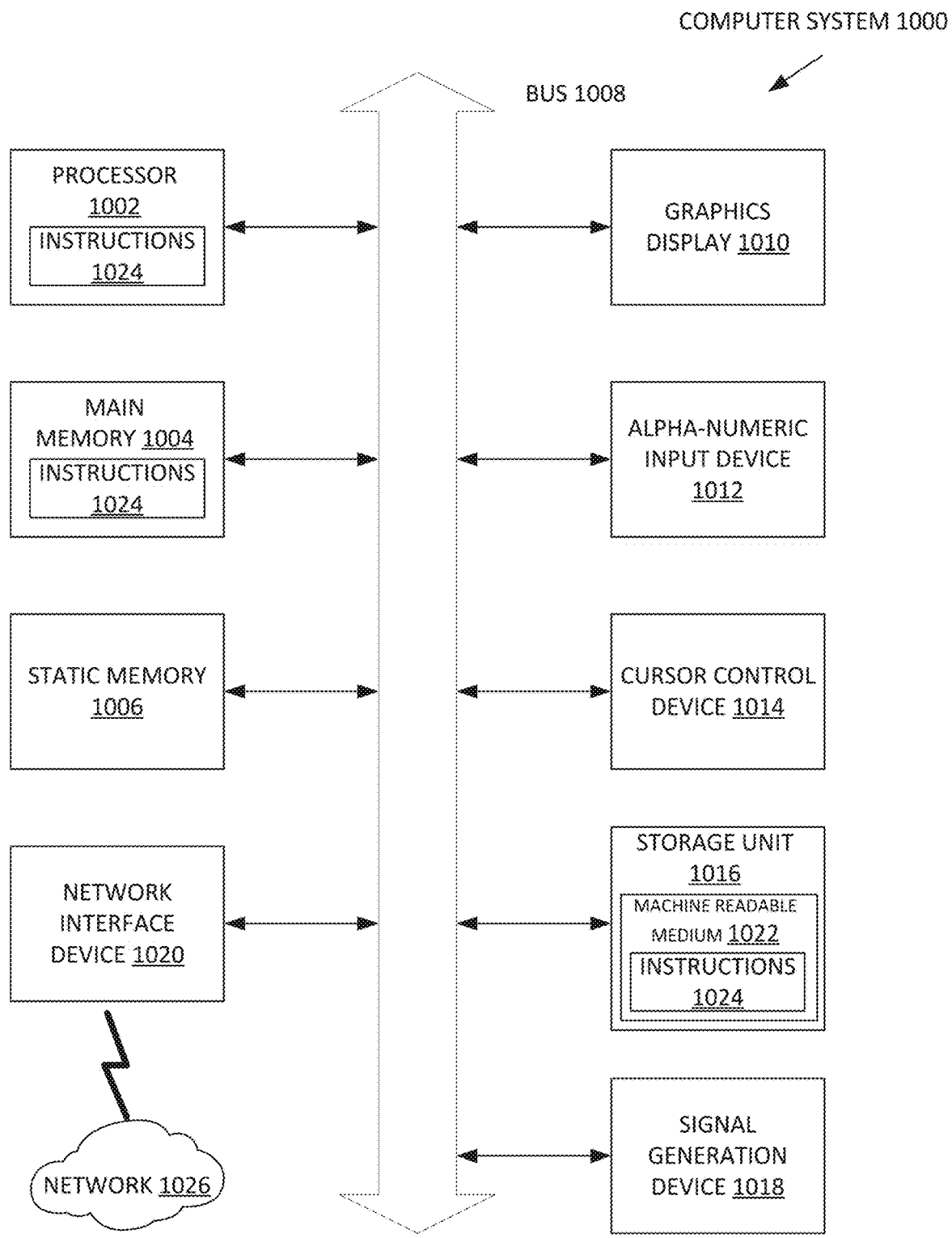
FIG. 10 depicts a block diagram illustrating entities of an example machine according to some embodiments.

FIG. 10 is a block diagram illustrating entities of an example machine able to read instructions from a machine-readable medium and execute those instructions in a processor to perform the machine processing tasks discussed herein, such as the engine operations discussed above. Specifically, FIG. 10 shows a diagrammatic representation of a machine in the example form of a computer system 1000 within which instructions 1024 (e.g., software) for causing the machine to perform any one or more of the methodologies discussed herein may be executed in alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, While only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPI), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a data store 1016, a signal generation device 1018 (e.g., a speaker), an audio input device 1026 (e.g., a microphone) and a network interface device 1020, which also are configured to communicate via the bus 1008.

The data store 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software may be transmitted or received over a network (not shown) via network interface 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 10. Alternatively, hardware or software modules may be stored elsewhere within a computing system.

As referenced herein, a computer or computing system includes hardware elements used for the operations described here regardless of specific reference in FIG. 10 to such elements, including for example one or more processors, high speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A method comprising:
receiving network data from a network traffic monitoring platform, the network traffic monitoring platform being in communication with the enterprise network, the network data identifying communication between entities of the enterprise network;
analyzing the network data to identify a plurality of applications of the enterprise network, the analysis of the network data including identifying from the network data the plurality of entities that communication with each other and comparing at least a first quality based on the communication between at least two of the plurality of entities to a first threshold to identify at least one application of the plurality of applications of the enterprise network;
receiving a request to suspend the application discovery process and creating a bookmark of the last network data received from the network traffic monitoring platform, the request to suspend the application discovery process being sent when one of a plurality of suspension trigger conditions is satisfied;
receiving a request to reinitiate the application discovery process and receiving the network data from the network traffic monitoring platform as indicated by the bookmark, the request to reinitiate the application discovery process when one of a plurality of reinitiation trigger condition is satisfied; and
creating a discovered application entry from the at least one identified application of the enterprise network.

2. The method of claim 1 further comprising:
receiving application data from a first application performance platform, the first application performance platform being in communication with the enterprise network.

3. The method of claim 1 further comprising:
receiving application data from a second application performance platform, the second application performance platform being in communication with the enterprise network.

4. The method of claim 3 further comprising:
discovered application entries from the first application performance platform is prioritized over the second application performance platform.

5. The method of claim 1 further comprising:
wherein the first quality being a duration that at least two entities of the enterprise network are in communication with each other and the first threshold being a communication duration threshold.

6. The method of claim 1 further comprising:
wherein the first quality being an amount of data traffic that at least two entities of the enterprise network are in communication with each other and the first threshold being a data traffic threshold.

7. The method of claim 1, the application discovery process further comprising:
wherein the first quality being a creation time of entities of the enterprise network, the first threshold being entities introduction threshold.

8. The method of claim 2, the application discovery process further comprising:
wherein the first application performance platform includes Netflow.

9. A system comprising:
one or more processors;
memory containing instructions to control the one or more processors to:
initiation of an application discovery process of an enterprise network, the application discovery process comprising:
receiving network data from a network traffic monitoring platform, the network traffic monitoring platform being in communication with the enterprise network, the network data identifying communication between entities of the enterprise network;
analyzing the network data to identify a plurality of applications of the enterprise network, the analysis of the network data including identifying from the network data the plurality of entities that communication with each other and comparing at least a first quality based on the communication between at least two of the plurality of entities to a first threshold to identify at least one application of the plurality of applications of the enterprise network;
receiving a request to suspend the application discovery process and creating a bookmark of the last network data received from the network traffic monitoring platform, the request to suspend the application discovery process being sent when one of a plurality of suspension trigger conditions is satisfied;
receiving a request to reinitiate the application discovery process and receiving the network data from the network traffic monitoring platform as indicated by the bookmark, the request to reinitiate the application discovery process when one of a plurality of reinitiation trigger condition is satisfied; and
creating a discovered application entry from the at least one identified application of the enterprise network.

10. The system of claim 9, the application discovery process further comprising:
receiving application data from a first application performance platform, the first application performance platform being in communication with the enterprise network.

11. The system of claim 10, the application discovery process further comprising:
receiving application data from a second application performance platform, the second application performance platform being in communication with the enterprise network.

12. The system of claim 11, the application discovery process further comprising:
discovered application entries from the first application performance platform is prioritized over the second application performance platform.

13. The system of claim 9, the application discovery process further comprising:
wherein the first quality being a duration that at least two entities of the enterprise network are in communication with each other and the first threshold being a communication duration threshold.

14. The system of claim 9, the application discovery process further comprising:
wherein the first quality being an amount of data traffic that at least two entities of the enterprise network are in communication with each other and the first threshold being a data traffic threshold.

15. The system of claim 9, the application discovery process further comprising:
wherein the first quality being a match between prefixes of names of the plurality of entities of the enterprise network and the first threshold being a name matching threshold.

16. The system of claim 9, the application discovery process further comprising:
wherein the first quality being a time when entities are introduced into the enterprise network, the first threshold being entities introduction threshold.

17. The system of claim 9, the application discovery process further comprising:
wherein the entities of the enterprise network includes storage devices or switches.

18. The system of claim 10, the application discovery process further comprising:
wherein the first application performance platform includes Netflow.

19. The system of claim 18, the application discovery process further comprising:
wherein the first application performance platform includes probes configured to monitor data traffic between entities of the enterprise network.

20. A computer program product comprising a computer readable storage medium having program code embodied therewith, the program code executable by a computing system to cause the computing system to perform:
receiving network data from a network traffic monitoring platform, the network traffic monitoring platform being in communication with the enterprise network, the network data identifying communication between entities of the enterprise network;

analyzing the network data to identify a plurality of applications of the enterprise network, the analysis of the network data including identifying from the network data the plurality of entities that communication with each other and comparing at least a first quality based on the communication between at least two of the plurality of entities to a first threshold to identify at least one application of the plurality of applications of the enterprise network;

receiving a request to suspend the application discovery process and creating a bookmark of the last network data received from the network traffic monitoring platform, the request to suspend the application discovery process being sent when one of a plurality of suspension trigger conditions is satisfied;

receiving a request to reinitiate the application discovery process and receiving the network data from the network traffic monitoring platform as indicated by the bookmark, the request to reinitiate the application discovery process when one of a plurality of reinitiation trigger condition is satisfied; and creating a discovered application entry from the at least one identified application of the enterprise network.

* * * * *